United States Patent
Kano

(10) Patent No.: US 8,009,677 B2
(45) Date of Patent: Aug. 30, 2011

(54) PATH SETTING METHOD AND COMMUNICATION DEVICE IN NETWORK SEGMENTED INTO PLURALITY OF AREAS

(75) Inventor: Shinya Kano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1253 days.

(21) Appl. No.: 11/285,720

(22) Filed: Nov. 22, 2005

(65) Prior Publication Data

US 2007/0047465 A1    Mar. 1, 2007

(30) Foreign Application Priority Data

Aug. 26, 2005 (JP) ................................ 2005-245324

(51) Int. Cl.
*H04J 3/12* (2006.01)
*H04L 12/28* (2006.01)

(52) U.S. Cl. .................................... 370/395.3; 370/230

(58) Field of Classification Search .................. 370/254, 370/258, 230, 395.21
See application file for complete search history.

(56) References Cited

U.S. PATENT DOCUMENTS

| | | | | |
|---|---|---|---|---|
| 4,872,157 A * | 10/1989 | Hemmady et al. | ............. | 370/400 |
| 5,850,397 A * | 12/1998 | Raab et al. | ............. | 370/392 |
| 6,047,330 A * | 4/2000 | Stracke, Jr. | ............. | 709/238 |
| 7,061,911 B2 * | 6/2006 | Furuno | ............. | 370/392 |
| 7,420,933 B2 * | 9/2008 | Booth et al. | ............. | 370/254 |
| 7,463,591 B1 * | 12/2008 | Kompella et al. | ............. | 370/248 |
| 2002/0109879 A1 * | 8/2002 | Wing So | ............. | 359/118 |
| 2002/0141345 A1 * | 10/2002 | Szviatovszki et al. | ............. | 370/238 |
| 2003/0185217 A1 * | 10/2003 | Ganti et al. | ............. | 370/395.5 |
| 2004/0039839 A1 * | 2/2004 | Kalyanaraman et al. | ............. | 709/238 |
| 2004/0095922 A1 * | 5/2004 | Sasagawa | ............. | 370/351 |
| 2007/0030852 A1 * | 2/2007 | Szczesniak et al. | ............. | 370/392 |

FOREIGN PATENT DOCUMENTS

JP  2002-124976    4/2002
JP  2005-217754 A  8/2005

OTHER PUBLICATIONS

R. Coltun. The OSPF Opaque LSA Option. Network Working Group, Jul. 1998.
D. Katz et al. Traffic Engineering (TE) Extensions to OSPF Version 2. Network Working Group, Sep. 2003.

(Continued)

*Primary Examiner* — Dang Ton
*Assistant Examiner* — Ryan Kavleski
(74) *Attorney, Agent, or Firm* — Fujitsu Patent Center

(57) ABSTRACT

The communication device includes a transmission node connected to a transmission network, and a control node connected to a control network for controlling the transmission on the transmission network and setting the transmission of the transmission node, and the control node has a control link collecting unit collecting link information on the control network, a transmission link collecting unit collecting link information on the transmission network, a selection unit selecting, when determining a route from the transmission node to another transmission node as a terminating node outside the area, any one of the boundary control nodes as an egress node becoming an egress in a direction of the area, to which the terminating node belongs, based on the link information on the control network, and a determination unit determining a route to the egress node based on the link information on the transmission network.

6 Claims, 23 Drawing Sheets

OTHER PUBLICATIONS

K. Kompella, et al. OSPF Extensions in Support of Generalized Multi-Protocol Label Switching, draft-ietf-ccamp-ospf-gmpls-extensions-12.txt, Network Working Group, Oct. 2003.
D. Awduche, et al. RSVP-TE: Extensions to RSVP for LSP Tunnels. Network Working Group, Dec. 2001.
L. Berger, et al. Generalized Multi-Protocol Label Switching (GMPLS) Signaling Resource ReserVation Protocol-Traffic Engineering (RSVP-TE) Extensions. Network Working Group, Jan. 2003.
Adrian Farrel, et al. Crankback Signaling Extensions for MPLS and GMPLS RSVP-TE <draft-ietf-ccamp-crankback-05.txt>.
J. Moy. OSPF Version 2, Network Working Group, Apr. 1998.
"Japanese Office Action", mailed by JPO and corresponding to Japanese application No. 2005-245324 on Feb. 2, 2010, with English translation.
Fujita, Norihito et al., "Hierarchical Scaleable IP-QoS Control System", Hierarchical Traffic Engineering System for a Large IP Network, The Institute of Electronics, Information and Communication Engineers, Technical Report (IEICE Technical Report), vol. 99, No. 507, Dec. 17, 1999, p.20-22 with Partial English Translation.

* cited by examiner

PATH SETTING METHOD AND COMMUNICATION DEVICE IN NETWORK SEGMENTED INTO PLURALITY OF AREAS

BACKGROUND OF THE INVENTION

1. Field of the Invention

The present invention relates to a path setting method in a network segmented into a plurality of areas and to a communication device employed in the network.

2. Description of the Related Art

There is an MPLS (Multi-Protocol Label Switching) technology as a technology enabling a packet to be transferred at a high speed. In the MPLS, unlike the conventional IP (Internet Protocol) routing, a packet is transferred based on a label attached to the packet.

Further, GMPLS (Generalized Multi-Protocol Label Switching) is given as a technology in which a concept of the MPLS is extended to and developed in a network (e.g., optical network) other than an IP network. In the GMPLS, for example, a concept of the label is applied to a wavelength of an optical signal in a WDM (Wavelength Division Multiplexing) network, and a transfer route is determined based on this wavelength.

The network employing the MPLS or the GMPLS is managed in physical or logical separation into a transmission network (which will hereinafter be referred to as a data plane) for transferring real data and a control network (which will hereinafter be referred to as a control plane) for conducting transfer control etc. of the real data. FIG. 15 is a diagram showing concepts of the data plane and the control plane in an MPLS/GMPLS network. As shown in FIG. 15, each of communication devices configuring the MPLS/GMPLS network has a control function (Nxx) and a transmission function (Dxx), and the MPLS/GMPLS network is configured by a control plane 1001 defined as a network to which the control functions (Nxx) of the communication devices are respectively connected and by a data plane 1002 defined as a network to which the transmission functions (Dxx) are respectively connected. For instance, a control function N11 and a transmission function D11 operate on one single communication device (1003 in FIG. 15).

On the control plane in this type of MPLS/GMPLS network, a control message based on three protocols that will be shown as below is exchanged. With this exchange of the message, the transfer control etc. of the real data flowing on the data plane is actualized.

A first protocol is a routing (which will hereinafter termed control plane routing) protocol used for each node to grasp a network topology of the control plane. Each of the nodes generates an LSA (Link State Advertisement) about a link between neighboring nodes on the control plane, and transmits the LSA to all the neighboring nodes on the control plane by use of the control plane routing protocol. The LSA contains items of information such as a self-node ID, an interface ID of the self-node, a neighboring node ID, an interface ID of the neighboring node and a cost on a link-by-link basis. The node receiving the LSA, if the information thereof is not-yet-received information, transfers this LSA to another neighboring node on the control plane. Given as this type of control plane routing protocol are OSPF (Open Shortest Path First) (refer to the following Non-Patent document 1), IS-IS (Intermediate System—Intermediate System) and so on.

A second protocol is a routing (which will hereinafter be called a data plane routing) protocol used for each node to grasp a network topology of the data plane. Each node generates an Opaque LSA (which will hereinafter be abbreviated to O-LSA) (refer to the following Non-Patent document 2) about a link between the neighboring nodes on the data plane, and transmits the O-LSA to all the neighboring nodes on the control plane. The O-LSA contains, in addition to the items of information contained in the LSA, items of information such as a bandwidth of the link and attribute values etc. of a data type of the link. The node receiving the O-LSA, if the information thereof is not-yet-received information, transfers the O-LSA to another neighboring node on the control plane. The data plane routing protocol is exemplified such as OSPF-TE (OSPF-Traffic Engineering) (refer to the following Non-Patent documents 3 and 4) and IS-IS TE.

FIG. 16 is a diagram showing concepts of the control plane routing and the data plane routing described above. As shown in FIG. 16, each node broadcasts the self-generated LSA and O-LSA to all the nodes on the control plane, and, when receiving the LSA and O-LSA from other nodes, transfers the LSA and O-LSA to another neighboring node.

A third protocol is a signaling protocol for setting a path in each of the nodes on the data plane. When setting the path, a path establishing request message and a path establishing response message are exchanged between the respective nodes on the path to be established. When releasing the path, a path delete request message and a path delete response message are exchanged between the respective path-already-set nodes. This type of signaling protocol is exemplified such as RSVP-TE (resource ReSerVation Protocol-Traffic Engineering) (refer to the following Non-Patent documents 5 and 6) and CR-LDP (Constraint-based Label Distribution Protocol).

The path establishing request message described above contains a path identifier, path attribute values (a bandwidth, a priority level, etc.), route information and so on. Any one of node information about all the nodes included in the path from an originating node to a terminating node, node information about some nodes included in the path from the originating node to the terminating node, and node information about only the terminating node, is set as the route information. A method of designating all the nodes included in the path in the path establishing request message is called full-strict designation.

Further, it is also possible to designate some nodes, through which the path goes, in the path establishing request message or to designate only the terminating node, in which case strict designation or loose designation is used. The strict designation is used in such a case that the strict-designated node is determined as a next downstream node on the should-be-established path, while the loose designation is used in a case where the path may go through other nodes on a route down to the loose-designated node.

A path establishing operation based on this type of signaling protocol will be explained with reference to FIG. 17. FIG. 17 is a diagram showing an operation of the path establishing signaling of a path from an originating node D11 to a terminating node D22. A node N11 on the control plane, which corresponds to the originating node D11 (the node D11 and the node N11 exist in the same communication device) generates a path establishing request message ([Path] shown in FIG. 17). At this time, the originating node N11 sets, in the route information of this path establishing request message, the node information of only the node N22 as the terminating node, or the node information of all the via-nodes (N11, N12, N14, N16, N18, N20, N22) on the path, or the node information of some via-nodes (e.g., N14, M18, N22) on the path. This route information is obtained by performing a route calculation (routing algorithm) based on, for example, the information in the O-LSA, i.e., the network topology information of the data plane, or is set through manual inputting by a network administrator who requests the path to be established.

The originating node N11 determines based on the generated route information that a neighboring via-node on the path is a node D12. Then, the originating node N11, when judging from the information in the O-LSAs collected by using the data plane protocol that a link between the neighboring node D12 and the self-node can be established, sets the path in the node D11, thereby establishing the path. Then, the originating node N11 transmits the path establishing request message to the node N12 on the control plane, which corresponds to the neighboring node D12.

Thereafter, the relay nodes (N12, N14, N16, N18, N20) each receiving the path establishing request message set the path in corresponding transmission nodes (D12, D14, D16, D18, D20). When establishing the path, each of the relay nodes transfers the path establishing request message to a next downstream node in accordance with the route information stored in the path establishing request message. If the route information in the path establishing request message is the loose designation, the relay node computes a route from the network topology of the data plane and determines the downstream nodes. At this time, the relay node adds a result of the computation to the route information in the path establishing request message as the necessity may arise.

The terminating node N22, upon receiving the path establishing request message, effects the path setting in the transmission node D22 within the self-device, thereby establishing the path. Then, the terminating node N22, for notifying the originating node N11 that the path is completely established, sends a path establishing response message back to the originating node N11 in a way that traces back the route along which the path establishing request message has been transferred. When this path establishing response message reaches the originating node N11, the path establishing signaling is finished.

It should be noted that a path establishing signaling delete procedure likewise exists. Further, the discussion given above has exemplified the case, wherein the path setting in each transmission node (Dxx) is done when receiving the path establishing request message and so on, however, there might be a case of effecting the path setting when receiving the path establishing response message and so forth.

Moreover, the path establishing signaling has a function of establishing, if a link not satisfying a request is detected in the midway node in the process of the path establishing procedure and when the midway node searches for an alternate route different from the designated route, the path along this alternate route. This function is called crankback (refer to the following Non-Patent document 7). Herein, the crankback will be explained with reference to FIG. 18. FIG. 18 is a diagram showing a crankback operation of the path establishing signaling. FIG. 18 exemplifies a case where there is a path establishing request of a path from an originating node N1 to a terminating node N6 on the control plane.

The originating node N1 sets N1->N2->N3->N4->N5->N6 as a route to the terminating node N6, and sends the path establishing request message to the neighboring node N2 ((1) PATH). The relay node N4 tries to establish the path between the self-node and the node N5 defined as a downstream node on the route in accordance with the route information in this path establishing request message, however, if unable to establish the path due to an error such as a lack of bandwidth, the node N4 sends a path establishing error message ((5) PATHERR in FIG. 18) stored with error link information back to the upstream node N3. The path establishing error message is transferred up to the node N2 having the crankback function.

The node N2 having the crankback function, when receiving the path establishing error message, deletes the error link from the network topology of the data plane, and performs the route calculation, thus searching for an alternate route ((7) in FIG. 18). The example n FIG. 18 is that the route via the node N7 is searched for, and the path establishing request message containing the route information of this searched route is sent toward the node N7. Note that the node N2, if unable to search for the alternate route through the route calculation, sends, it follows, the path establishing error message stored with information about the error point toward the upstream node on the path.

The Non-Patent document 1 is ""OSPF Version 2", Network Working Group Request for Comments (RFC) 2328, April 1998."

The Non-Patent document 2 is ""The OSPF Opaque LSA Option", Network Working Group Request for Comments (RFC) 2370, July 1998."

The Non-Patent document 3 is ""Traffic Engineering (TE) Extensions to OSPF Version 2", Network Working Group Request for Comments (RFC) 3630, September 2003."

The Non-Patent document 4 is ""OSPF Extensions in Support of Generalized Multi-Protocol Label Switching", Network Working Group Internet Draft, October 2003."

The Non-Patent document 5 is ""RSVP-TE: Extensions to RSVP for LSP Tunnels", Network Working Group Request for Comments (RFC) 3209, December 2001."

The Non-Patent document 6 is ""Generalized Multi-Protocol Label Switching (GMPLS) Signaling Resource Reservation Protocol-Traffic Engineering (RSVP-TE) Extensions", Network Working Group Request for Comments (RFC) 3473, January 2003."

The Non-Patent document 7 is ""Crankback Signaling Extensions for MPLS and GMPLS RSVP-TE", Network Working Group Internet Draft, May 2005."

The MPLS/GMPLS network described above has, however, a problem that each node must retain the information about all other nodes on the control plane and on the data plane, and consequently a database of each node is hypertrophied. Further, another problem is that a quantity of the information exchanged within the network increases.

Such being the case, a technique of managing the network in a way that segments the network into a plurality of areas, is adopted. FIG. 19 is a diagram illustrating the MPLS/GMPLS network in the case of its being segmented into the plurality of areas. An example in FIG. 19 shows that the network is segmented into an area 1, an area 2 and an area 0 serving as a backbone area for the areas 1 and 2. Then, on the control plane, the nodes N14 and N15 are provided at a boundary between the area 1 and the area 0, while the nodes N18 and N19 are provided at a boundary between the area 0 and the area 2. On the data plane, the boundary nodes are the transmission nodes (D14, D15, D18, D19) corresponding to the boundary nodes on the control plane.

Herein, a description of how the control plane routing, the data plane routing and the signaling explained earlier operate on the network thus segmented into the plurality of areas, will hereinafter be made. In the following discussion, the OSPF is exemplified as the control plane routing, the OSPF-TE is exemplified as the data plane routing, and the RSVP-TE is exemplified as the signaling protocol.

To begin with, the operation of the control plane routing will be explained with reference to FIGS. 20 and 21. FIG. 20 is a diagram showing the control plane routing in the area 0 serving as the backbone area. FIG. 21 is a diagram showing the control plane routing in the area 1. The OSPF is an IP routing protocol and has a function of summarizing a network topology of each individual area and notifying the other areas of the summarized topology in order to actuate transferring IP packets between the plurality of areas.

With this operation, in the area 0, the boundary nodes N14 and N15 respectively generate summary LSAs about links between the nodes N11, N12, N13 in the area 1 and the boundary nodes, and send the summary LSAs to other nodes in the area 0. The summary LSA is generated to contain information such as a link cost of a link on the assumption that a node existing in a different area but not neighbored is virtually connected. For example, the boundary node N14 is, though not neighbored to the node N11, assumed to be neighbored thereto and generates the summary LSA. Similarly, the boundary nodes N18 and N19 generate the summary LSAs with respect to the nodes N20, N21 and N22 in the area 2, and send the summary LSAs to other nodes within the area 0.

In the area 1, as shown in FIG. 21, the boundary nodes N14 and N15 generate the summary LSAs about the links between the respective nodes belonging to the area 0 and the area 2 and the boundary nodes, and then send the summary LSAs to other nodes in the area 1. Note that the nodes N11, N12 and N13 each defined as none of the boundary node generate the LSAs and send the LSAs to other nodes. In the area 2, as in the case of the area 1, the nodes N18 and N19 defined as the boundary nodes generate the summary LSAs.

Next, an operation of the data plane routing will be explained with reference to FIGS. 22 and 23. FIG. 22 is a diagram showing the data plane routing in the area 0 defined as the backbone area. FIG. 23 is a diagram showing the data plane routing in the area 1. As shown in FIGS. 22 and 23, the OSPF-TE has no function of notifying of the link information over the area, and hence each node is unable to know the link information etc. on the data plane with respect to other nodes outside the area. This is because the IP routing protocol handles only the cost and the topology about the respective links, and, by contrast, the data plane routing protocol such as the OSPF-TE comes to handle a multiplicity of parameters such as link bandwidth information and a type of fault recovery function, and outline information is hard to be created.

Thus, in the conventional MPLS/GMPLS network, in the case of segmenting the network into the plurality of areas, as to the data plane, the link information in the other areas can not be exchanged, and consequently a problem arises, wherein a path to the node in another area can not be automatically established.

Then, to solve this problem, there has hitherto been adopted such a technique that a network administrator, if needed to set the path over the area, fixedly sets a should-be-through boundary node. This method has, however, a problem that at-once flexibility can not be given to a case where a predetermined path can not be set due to deficiency of the link bandwidth, a link fault, etc.

SUMMARY OF THE INVENTION

It is an object of the present invention, which was devised in view of those problems, to provide a communication device that automatically properly sets a path over an area in a network system, wherein the network is segmented into a plurality of areas.

The present invention adopts the following configurations in order to solve the problems described above. Namely, the present invention is a communication device including a transmission node connected to a transmission network and performing data transmission and a control node connected to a control network for controlling the transmission on the transmission network and performing the transmission setting of the transmission node, the communication device belonging to a network having the transmission network and the control network, the transmission network and the control network being respectively segmented into a plurality of areas, the transmission node and the control node, taking charge of the transmission setting of the transmission node, respectively existing in any one of the plurality of areas corresponding to each other, the control node comprising: a control link collecting unit collecting link information, on the control network, about links between the respective control nodes within the same area, and summary link information about links between a boundary control node being the control node within the same area and located at a boundary with another area and the control node existing outside the area; a transmission link collecting unit collecting detailed link information, being link information on the transmission network, about links between the respective transmission nodes existing within the same area; a selection unit selecting, when determining a route from the transmission node, of which the transmission setting is taken charge of, to another transmission node as a terminating node outside the area, any one of the boundary control nodes as an egress node becoming an egress in a direction of the area, to which the terminating node belongs, on the basis of the link information on the control network; and a determination unit determining a route to the egress node on the basis of the link information on the transmission network.

The control node collects and retains, as the control network, the link information about the links between the respective control nodes within the same network and the summary link information about the link to the control node outside the area, and, as to the transmission network, collects and retains the detailed link information about the links between the transmission nodes within the same area. The link information is e.g., LSA (Link State Advertisement) information such as a cost, and the summary link information is information based on, e.g., a summary LSA. Further, the detailed link information is, e.g., O-LSA information and is information such as a bandwidth of the link and attribute values of data type of the link.

When there is a route determination request of a route from the originating transmission node to the terminating transmission node outside the area and so on, the control node, when judging that the control node taking charge of controlling the terminating transmission node is a node outside the area, determines, based on the link information on the control network, any one of the boundary control nodes as the egress node serving as the egress in the direction of the area to which the terminating control node belongs.

Subsequently, the control node determines the route to the determined egress node on the basis of the detailed link information on the transmission network.

Thus, in the present invention, a protocol capable of grasping the link information and the summary link information on the whole control network is cooperated with a protocol capable of grasping the detailed link information on the transmission network within the area, whereby the egress node serving as the relay node to the other area to which the terminating node belongs from within the area, can be automatically determined. With this contrivance, in the present invention, the path over the area can be automatically determined.

Further, in the present invention, the selection unit may select the egress node on the basis of the summary link information about the link between the terminating node and the boundary control node.

Moreover, in the present invention, the selection unit may select the egress node on the basis of the summary link information about the link between the terminating node and the boundary control node and respective pieces of link information of the links to the boundary control node within the same area.

With this operation, the proper egress node can be selected, and it is therefore possible to properly determine the path over the area.

Still further, in the present invention, the selection unit reselects, when the determination unit judges that the routes to the egress node include none of the route satisfying a request, as an egress node, any one of the other boundary control nodes excluding the egress node.

In the present invention, when the egress node selected based on the link information on the control network is judged to be an inappropriate relay node on the basis of the detailed link information on the transmission network, the determined egress node is excluded from the link information on the control network, and an egress node is again determined.

Yet further, the determination unit further includes a response unit sending back, even in the case of selecting any one of the boundary control nodes as the egress node and when judging that the routes to the egress node include none of the route satisfying the request, a path establishing error message having a setting of node information showing a self-node as error information, and the selection unit, when judging based on the node information set in the error information of the path establishing error message sent from the other control node that the control node with an error occurred is the boundary control node, reselects, as the egress node, any one of the other boundary control nodes excluding the control node specified by the node information.

In the present invention, the boundary control node determined as the egress node, in the case of determining the egress node in the self-area, when further judging that the egress node can not be determined as a result of repeating the re-determination, judges that the boundary control node itself is not appropriate for the egress node. Then, the boundary control node notifies the neighboring node of this purport by a path establishing error message.

In the control node receiving the path establishing error message, when detecting that the node contained in the error information is the boundary control node, the boundary control node is excluded, and the egress node is again determined.

With this operation, even when the egress node determined based on the link information on the control network is judged inappropriate from the detailed link information on the transmission network, automatic restoration is done, and a proper route is eventually determined.

Moreover, in the present invention, the response unit attaches information showing whether or not the self-node is the boundary control node to the error information, and the selection unit judges, from the information showing whether or not the node is the boundary control node set in the error information, that the control node specified by the node information is the boundary control node.

Furthermore, in the present invention, the communication device further comprising a retaining unit retaining a list of the boundary control nodes, wherein the selection unit judges, from a comparison between the node information set in the error information and the list of the boundary control nodes, whether the control node specified by the node information is the boundary control node or not.

With this contrivance, it can be distinguished from the node information set in the error information between the node inappropriate as the egress node (the boundary node) and the control node that simply lacks communication resources requested.

Further, in the present invention, the selection unit further includes a calculation unit calculating a route to the selected egress node by use of the link information on the control network, and a modifying unit modifying, when detecting the control node connected by a virtual link by searching the link information on the control network from the self-node toward the selected egress node along the determined route, the detected control node as the egress node.

With this contrivance, for instance, in the network having a configuration including an area that is not connected to the backbone area, it is possible to actualize the system capable of automatically performing the proper path setting without any case where the determination of the egress node is not properly done due to the use of the virtual link.

Moreover, in the present invention, the selection unit may further include a calculation unit calculating a route to the selected egress node by use of the link information on the control network, and a modifying unit modifying, when detecting the control node connected by a real link by searching the link information on the control network from the selected egress node toward the self-node along the determined route, the detected control node as the egress node.

With this configuration, there is a case of determining the route faster than by the previous configuration.

It should be noted that the present invention may also be a program for actualizing any one of the functions given above. Moreover, the invention may also be a readable-by-computer storage medium stored with such a program.

According to the present invention, it is possible to actualize the communication device that automatically properly sets the path over the area in the network system, wherein the network is segmented into the plurality of areas.

DESCRIPTION OF THE PREFERRED EMBODIMENTS

An MPLS/GMPLS network system configured by communication devices in each of embodiments of the present invention will hereinafter be described with reference to the drawings. It should be noted that configurations, which will be described as below, are exemplifications, and the present invention is not limited to the configurations of the following embodiments.

First Embodiment

The MPLS/GMPLS network system (which will hereinafter be referred to as the system) configured by the communication devices in a first embodiment of the present invention will hereinafter be explained with reference to the drawings.

[System Architecture]

Figure 1:
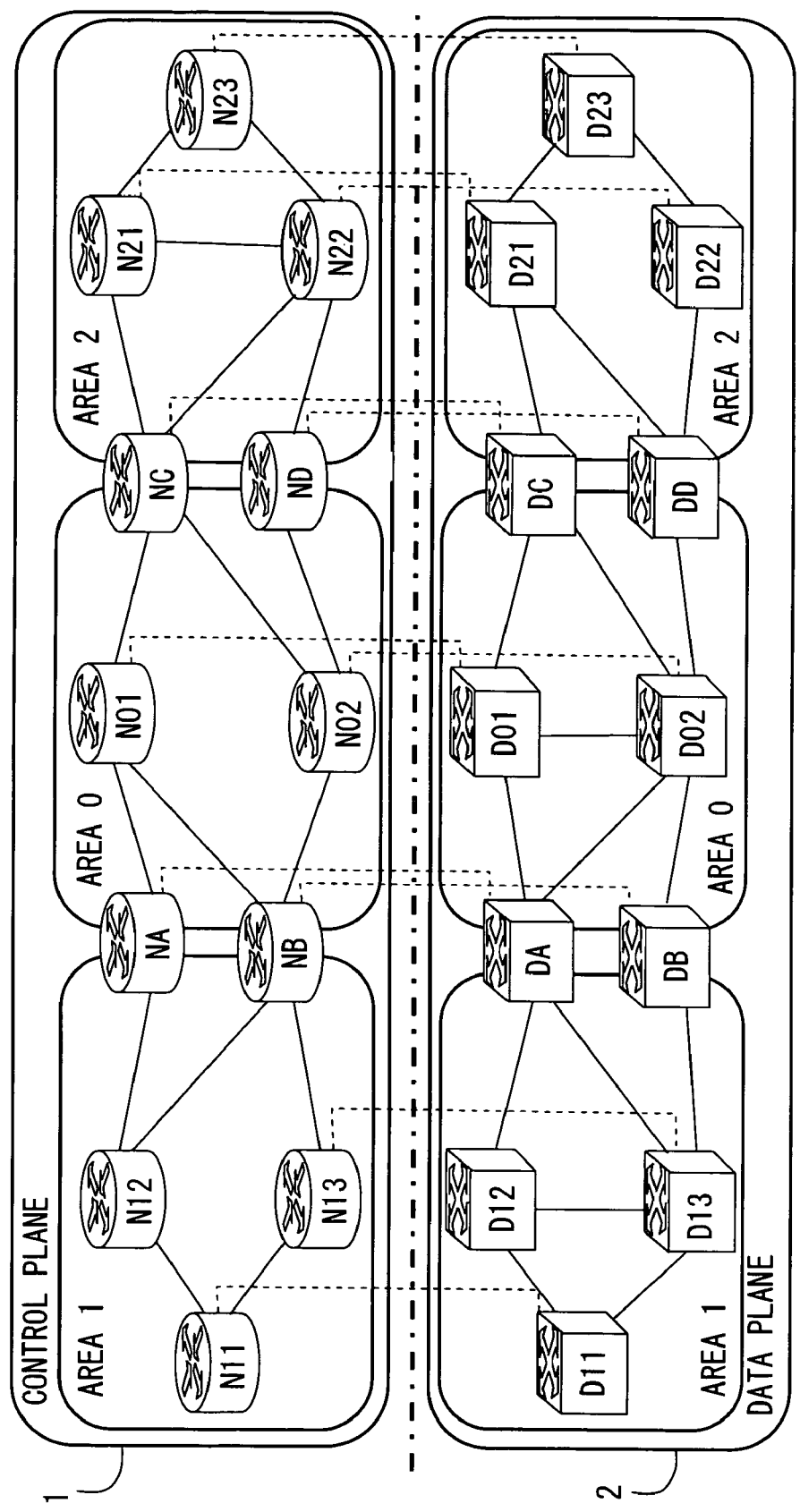
FIG. 1 is a diagram showing a network architecture in a first embodiment.

To begin with, a network architecture of the system will be explained with reference to FIG. 1. FIG. 1 is a diagram showing the network architecture of the system. In the system, a data plane 2 for transferring real data and a control plane 1 for executing transfer control etc. of the real data, are managed in separation. To be specific, the communication devices configuring the system each has a control function (Nxx) and a transmission function (Dxx), thereby building up the control plane 1 in which the respective control functions (Nxx) are connected to each other and the data plane 2 in which the respective transmission functions (Dxx) are connected to each other. The control function Nxx and the transmission function Dxx shown in FIG. 1, which have the same numerals in their "xx" portions, operate within the same communication device. For example, the control function N11 and the transmission function D11 operate within the same communication device. Hereafter, these control function and transmission function will be termed nodes, a control node, or a transmission node.

Further, in the system, the networks are managed in a way that segments each of the networks into an area 1, an area 2 and an area 0 serving as a backbone area for the area 1 and the area 2. Then, on the control plane 1, a node NA and a node NB are provided at a boundary between the area 1 and the area 0, and a node NC and a node ND are provided at a boundary between the area 0 and the area 2. On the data plane, boundary nodes are transmission nodes (DA, DB, DC, DD) within the same communication devices as those including the boundary nodes on the control plane.

Note that in the system, a network topology of the control plane 1 and a network topology of the data plane 2 are configured differently, however, the networks may be built up in the same network topology. Further, the explanation is given such that the transmission function and the control function operate within the same communication device, however, these functions may also operate in different communication devices. In this case, a requirement for the configuration is that the control function knows neighboring node (link) information in the transmission function.

[Communication Device]

Each of the communication devices configuring the system includes a network interface, a CPU (Central Processing Unit), a memory, an I/O interface, etc., wherein the CPU executes a control program stored on the memory, thereby controlling a plurality of network interfaces. In the communication device, the control function (Nxx) and the transmission function (Dxx) may be configured to perform communications by use of, e.g., these respective network interfaces. The following is an explanation of each of the functions (nodes).

The transmission node (Dxx) exchanges the real data (user data) on the data plane. MPLS or GMPLS etc. is given as a protocol employed on the data plane in order to exchange the real data.

The control node (Nxx) performs the transfer control etc. of the data plane to efficiently exchange the real data on the data plane. The control node, for conducting this transfer control, exchanges a control message with the control nodes on the control plane by use of IP. Protocols for exchanging this control message are the same as those explained in the item of Background Art, and are exemplified such as a control plane routing protocol, a data plane routing protocol and a signaling protocol. The system has an improvement of the signaling protocol among those protocols. Information exchanged based on the control plane routing protocol and the data plane routing protocol is as explained earlier, and hence a simply-organized description thereof is given as below.

The control node exchanges a LSA about each link on the control plane with other control nodes within the same area. Further, as for other control nodes outside the area, the boundary bode generates and transfers a summary LSA to the control nodes within the area. On the other hand, as for the link information on the data plane, the data plane routing protocol has none of the function of notifying over the area, and hence the control node exchanges only in-area detailed link information with the control nodes.

Accordingly, each control node, through the information exchange using the routing protocols, as to the control plane, has in-the-same-area link information (the information based on the LSA) and outside-area summary link information (the information based on the summary LSA) and has, as to the data plane, in-the-same-area detailed link information.

Next, a path establishing function of the control node by use of the signaling protocol will be explained. The control nodes exchange a path establishing request message containing route information and a path establishing response message on the control plane, thereby establishing a path from an originating node to a terminating node on the data plane. Note that the control node similarly releases the path, however, this deviates from the gist of the present invention, so that its explanation is omitted.

The control node, in the case of becoming the originating node of the should-be-established path, searches for a route of the paths on the basis of the retained link information, generates route information based on the searched route, and sends the path establishing request message in which this route information is set to a neighboring node on the route. Hereat, the control node judges, based on the link information or the summary link information on the control plane, whether the terminating node of the path is within the same area or outside the area. The control node, if the terminating node of the path exists in the same area, searches for the route by employing the detailed link information on the data plane.

While on the other hand, if the terminating node of the path is outside the same area, the control node determines an egress node serving as a relay node to the terminating node. For the egress node, there is selected any one of the boundary nodes existing with the same area as a path establishing request message transmission target node exists as well as being the boundary nodes to the neighboring area toward the area to which the terminating node belongs. Further, the route within the same area up to the egress node is determined by use of the detailed link information on the data plane. The control node, when determining the egress node, sends the path establishing request message to which the route information strict-designating the egress node is added.

<Egress Node Determination Method>

Figure 2:
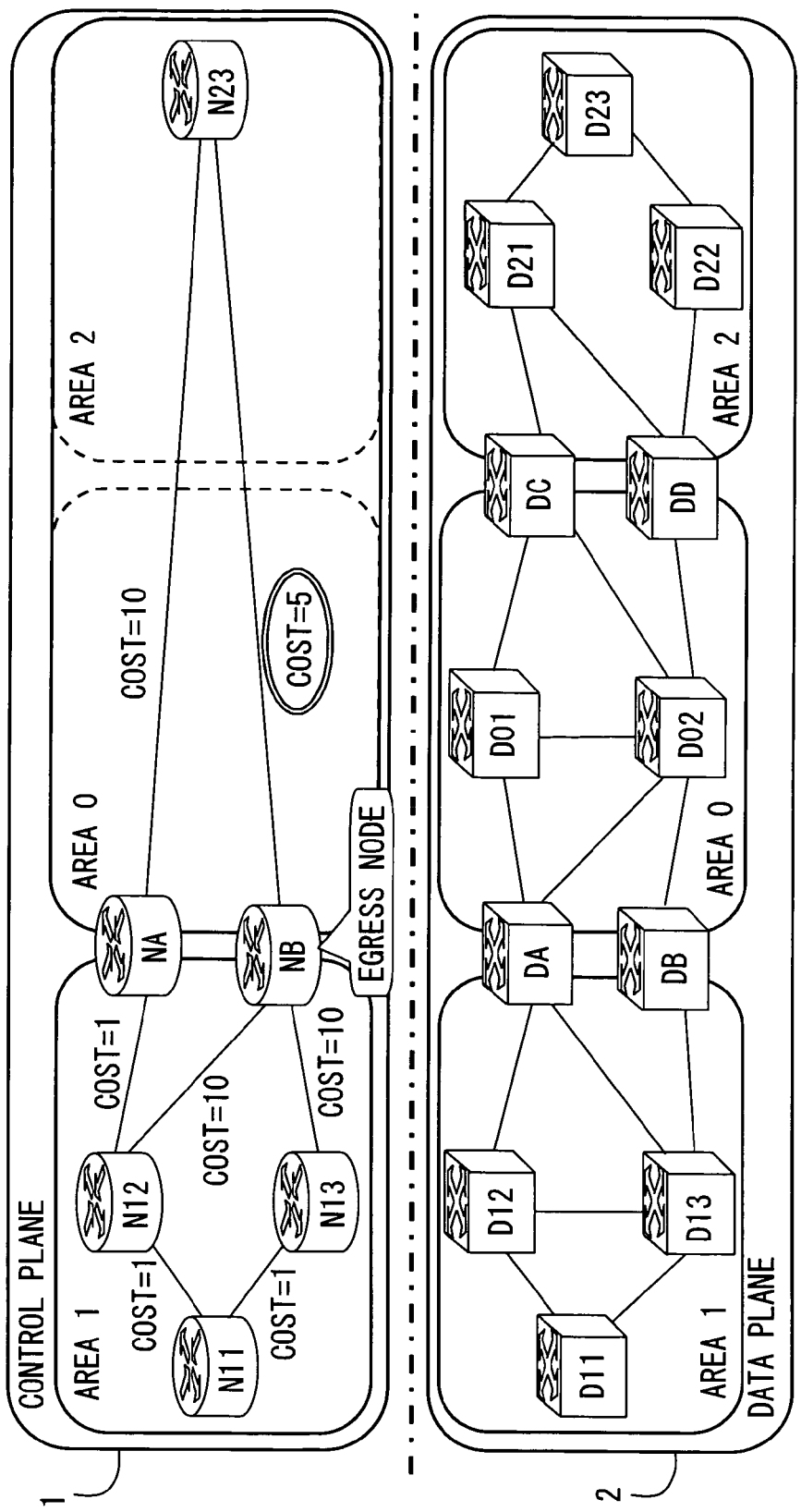
FIG. 2 is a diagram showing an egress node determination method 1 in the first embodiment.
Figure 3:
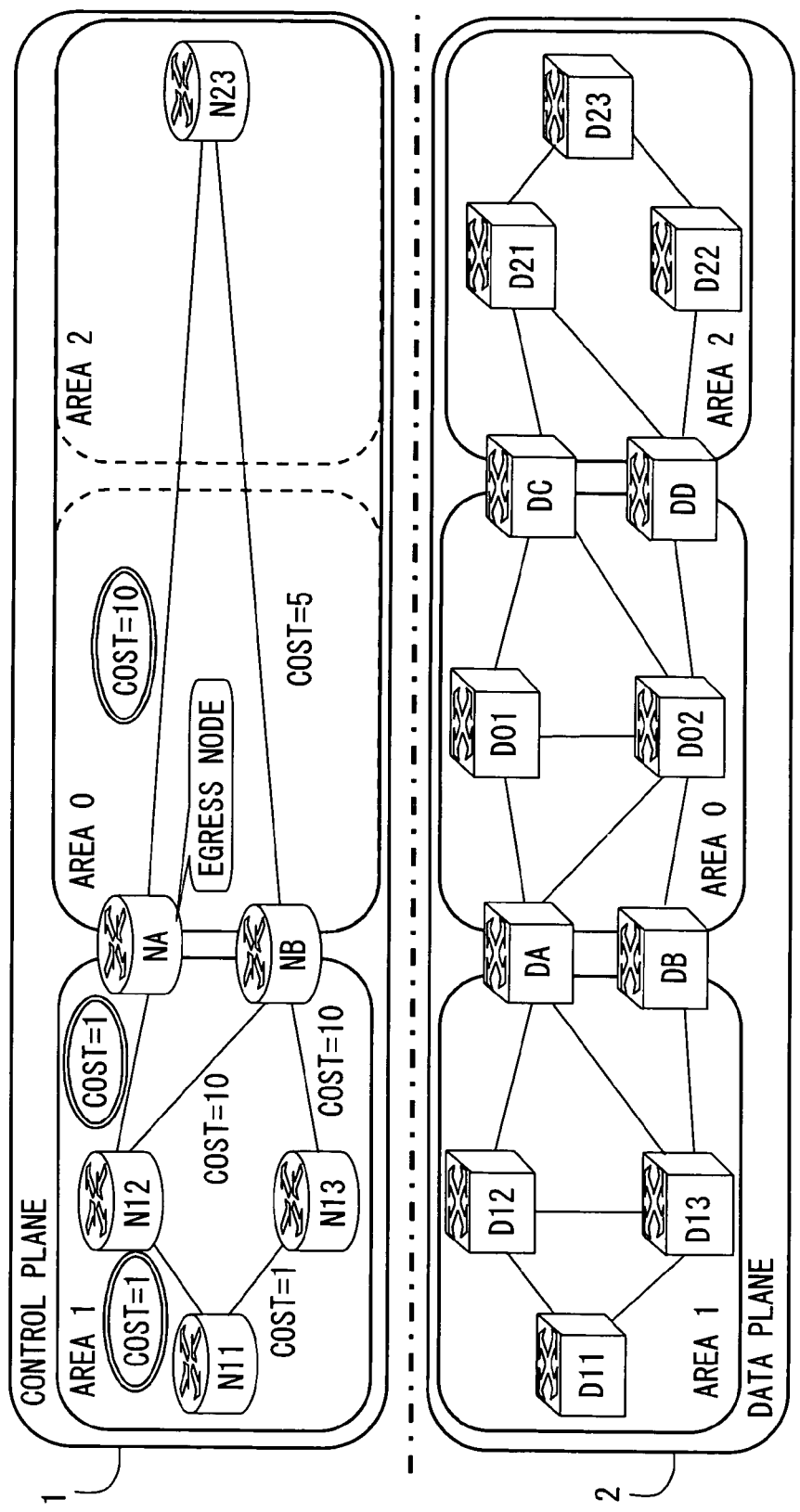
FIG. 3 is a diagram showing an egress node determination method 2 in the first embodiment.

An egress node determination method in the control node will be explained with reference to FIGS. 2 and 3. Two methods, which will be shown as below, are considered as this type of egress node determination method, and either method may be available.

A first egress node determination method will be explained with reference to FIG. 2. FIG. 2 is a diagram showing an egress node determination method 1. The egress node determination method 1 is a method for determining the egress node on the basis of the summary link information on the control plane to the terminating node outside the area. The summary link information involves using, for instance, a summarized cost value. The control node determines, as the egress node, a boundary node having a minimum summarized cost value to the terminating node outside the area. An example in FIG. 2 is that the summarized cost value between the boundary node NA and a terminating node N23 on the control plane is 10, and the summarized cost value between the boundary node NB and this terminating node N23 is 5, so that the boundary node NB is selected as the egress node.

A second egress node determination method will be described with reference to FIG. 3. FIG. 3 is a diagram showing an egress node determination method 2. The egress node determination method 2 is a method for determining the egress node in a way that takes into consideration, in addition to the information (the summary link information on the control plane to the terminating node outside the area) considered in the method 1, a piece of link information on the control plane within the area up to the boundary node. The control node determines as the egress node, with respect to each of the routes from the originating node within the same area to the terminating node outside the area, a boundary node exhibiting a minimum total value of the cost values and the summarized cost value. An example in FIG. 3 is that a total value of the cost values of the path reaching the terminating node N23 via the boundary node NA from the originating node N11 is 12 (=a node N11-to-N12 cost value (1)+a node N12-to-NA cost value (1)+a node NA-to-N23 summarized cost value (10)), and a total value of the cost values of the path reaching the terminating node N23 via the boundary node NB from the originating node N11 is 16 (=a node N11-to-N13 cost value (1)+a node N13-to-NB cost value (10)+a node NB-to-N23 summarized cost value (5)), whereby the boundary node NA is selected as the egress node.

Operational Example

Figure 4:
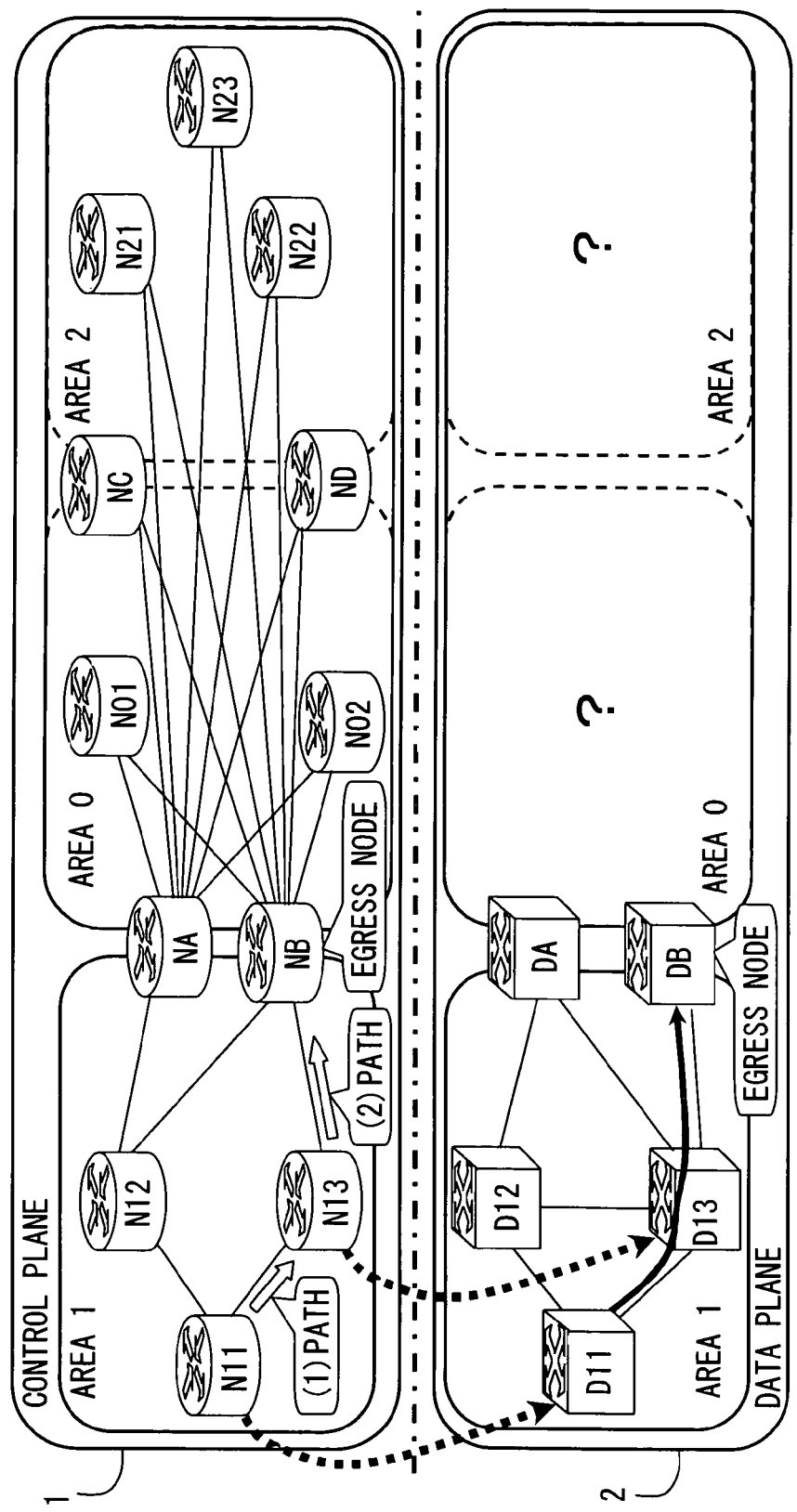
FIG. 4 is a diagram showing a path establishing signaling operation (area 1) in the first embodiment.
Figure 5:
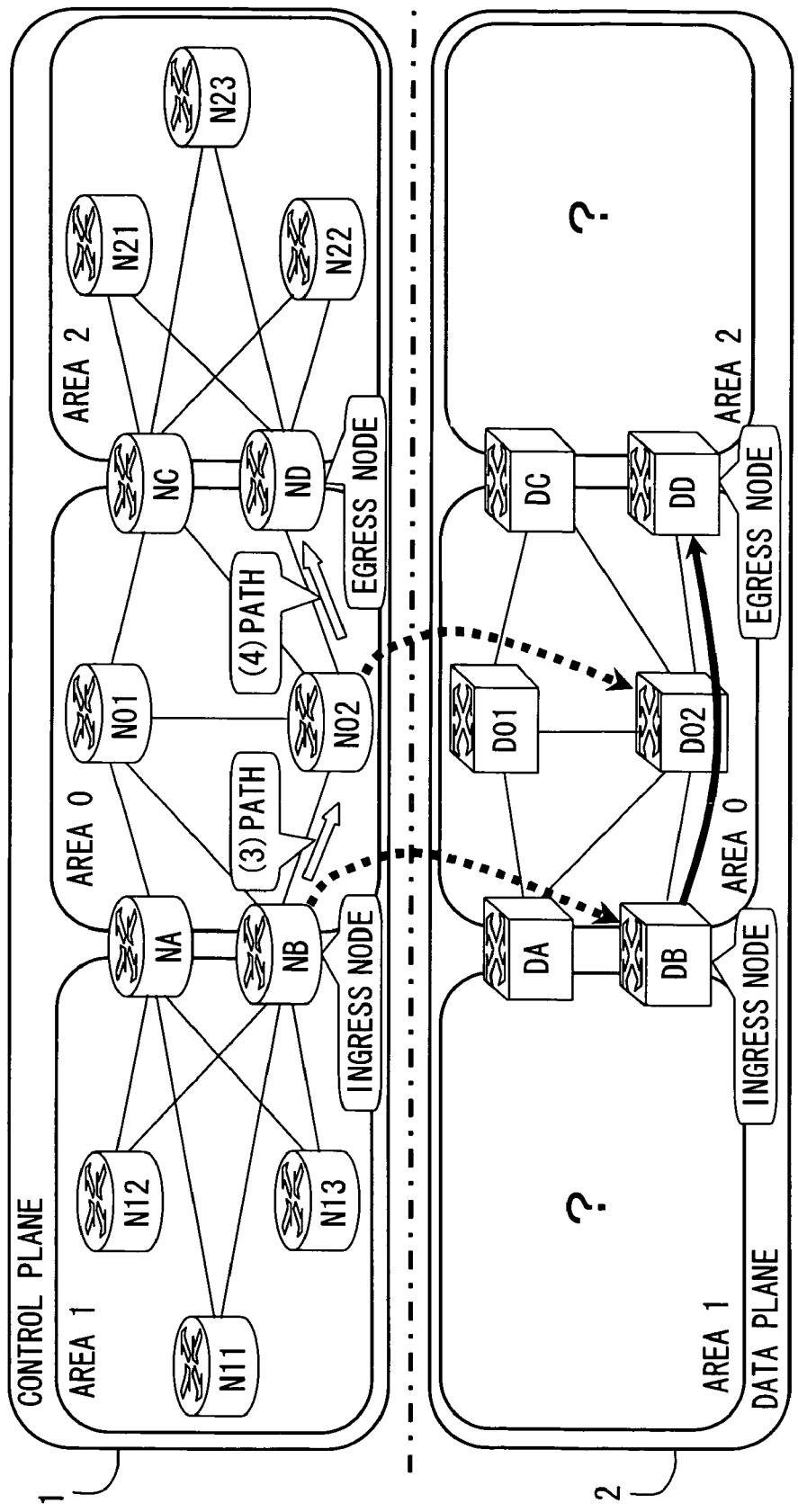
FIG. 5 is a diagram showing the path establishing signaling operation (area 0) in the first embodiment.
Figure 6:
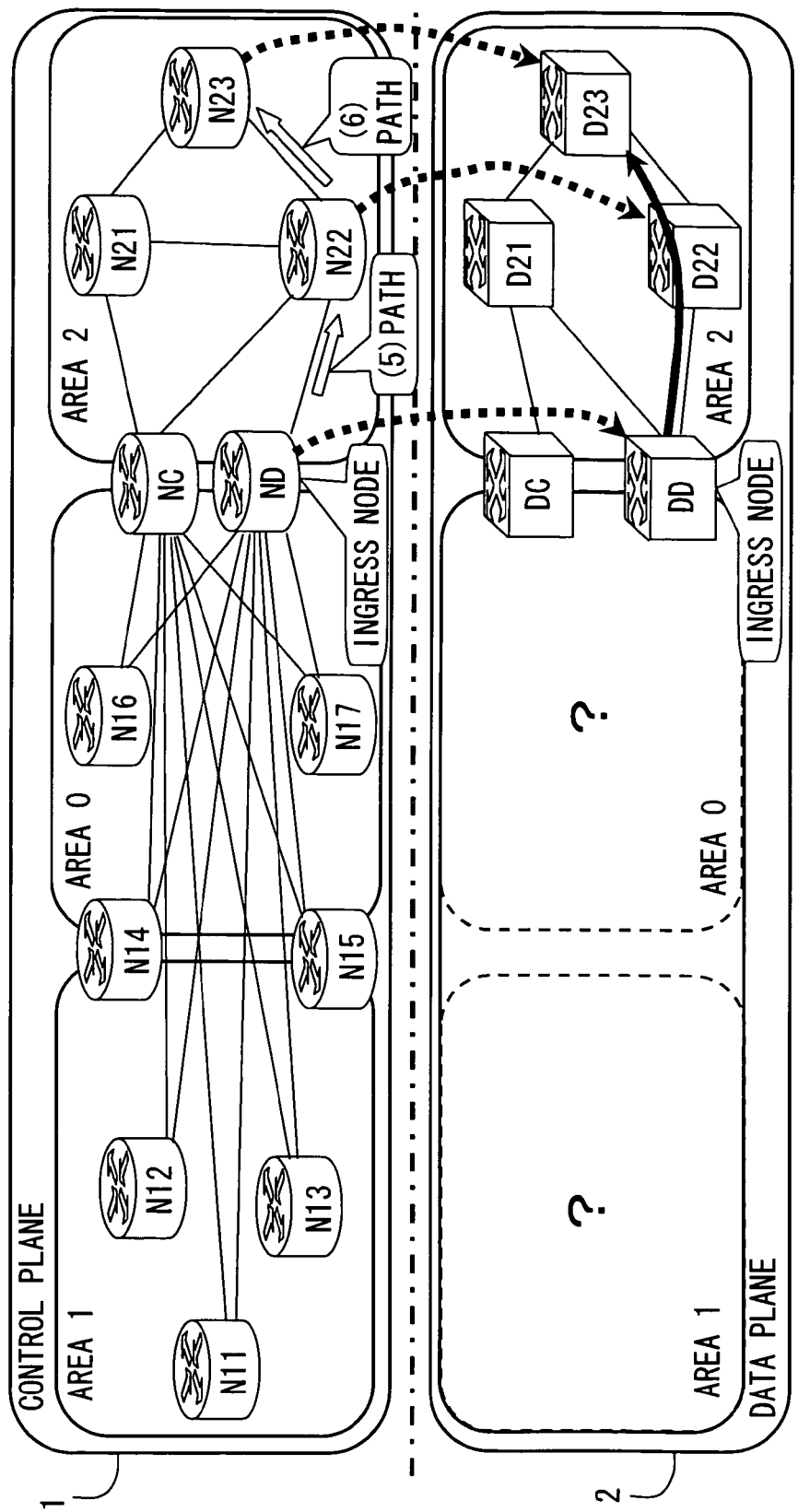
FIG. 6 is a diagram showing the path establishing signaling operation (area 2) in the first embodiment.

Next, an operational example of the system will be explained with reference to FIGS. 4, 5 and 6. FIGS. 4, 5 and 6 are diagrams each showing a path establishing signaling operation in the system. FIG. 4 shows an operation in the area 1, FIG. 5 shows an operation in the area 0, and FIG. 6 shows an operation in the area 2. In the following discussion, the path establishing signaling operation in the system will be described by exemplifying a case of establishing a path from a transmission node D11 to a transmission node D23.

To start with, a premise for the operation of the path establishing signaling is that each of the control nodes configuring the system, through the information exchange employing the routing protocols, with respect to the control plane, has the link information (the information based on the LSA) within the same area and the summary link information (the information based on the summary LSA) outside the area, and has, with respect to the data plane, the detailed link information within the same area. Namely, each control node collects pieces of information described above at a predetermined timing by employing the control plane routing protocol and the data plane routing protocol, and retains these pieces of information.

The control node N11 in charge of controlling the transmission node D11 becoming the originating node, at first, judges whether the control node N23 becoming the terminating node exists within the same area or not. The node N11, when judging that the node N23 is a node outside the same area, determines the egress node by use of the method 1 or 2 described earlier. To be specific, the node N11 determines, based on the link information or the summary link information on the control plane, any one of the boundary nodes NA and NB as the egress node. Herein, it is assumed that the node N11 determines the node NB as the egress node.

When determining the egress node, the node N11 determines a route from the node N11 to the egress node NB on the basis of the detailed link information on the data plane. Hereat, the node N11 determines the route up to the node NB in consideration of a communication bandwidth, a cost, etc. that are required of the should-be-established path. Herein, an assumption is that the node N11 selects the route via the node N13. The node N11 determining the in-area route sets a path, leading to the node D13, in the node D11 on the data plane in order to establish the path to the neighboring node on the thus-determined route. Subsequently, the node N11 strict-designates the node N13 and the node NB, and sends to the node N13 a path establishing request message containing route information with the loose-designated node N23 ((1) PATH in FIG. 4).

The node N13 receiving the path establishing request message sets a path, leading to the transmission node DB, in the transmission node D13 on the basis of the route information contained in this message in order to establish the path to the neighboring node on the route. The route information in this example has the to-be-neighbored node NB that is strictly designated, and therefore the node N13 does the path setting as it is. Note that if the to-be-neighbored node NB is not subjected to the strict designation, etc., the node N13 conducts a route calculation from the detailed link information on the data plane, and thus determines a downstream node on the route. The node N13, having done the path setting, transfers the path establishing request message to the downstream neighboring node NB on the basis of the route information ((2) PATH in FIG. 4).

The node NB receiving the path establishing request message, as the downstream node N23 set in the route information contained in the message is loose-designated, makes the downstream route calculation. The processes from this onward are the same as those when the originating node N11 generates the route information. Namely, the node NB judges whether the loose-designated node N23 exists in the same area or not. The node NB, when judging that the node N23 is a node outside the same area, determines the egress node by use of the method 1 or 2 described earlier. Specifically, the node NB determines as the egress node, based on the link information or the summary link information on the control plane, any one of the boundary nodes NC and ND to the area different from the area on the receiving side of the path establishing request message. Herein, it is assumed that the node NB determines the node ND as the egress node.

Upon determining the egress node, the node NB determines a route from the node NB down to the egress node ND on the basis of the detailed link information on the data plane. Herein, it is presumed that the node NB selects the route via the node N02. The node NB determining the in-area route, sets a path, leading to the node D02, in the transmission node DB in order to establish the path to the neighboring node on the determined route. Subsequently, the node NB strict-designates the node N02 and the node ND, and sends to the node N02 the path establishing request message containing the route information in which the node N23 is loose-designated ((3) PATH in FIG. 5).

An operation of the node N02 receiving the path establishing request message is the same as the operation of the node N13 explained before. Namely, the node N02 sets the path, leading to the transmission node DD, in the transmission node D02, and transfers the path establishing request message to the node ND ((4) PATH in FIG. 5).

The node ND receiving the path establishing request message, as the downstream node N23 set in the route information contained in the message is loose-designated, makes the downstream route calculation. In this case, however, the node N23 is a node within the same area, and hence the node ND determines the route down to the node N23 on the basis of the detailed link information on the data plane. It is herein assumed that the node ND selects the route via the node N22. The node ND, having determined the in-area route, sets a path leading to the node D22 in the transmission node DD in order to establish the path to the neighboring node on the thus-determined route. Subsequently, the node ND sends to the node N22 the path establishing request message containing the route information in which the node N22 and the node N23 are strict-designated ((5) PATH in FIG. 6).

Hereafter, the node N22 receiving the path establishing request message effects the path setting in the transmission node D22, and transfers the path establishing request message to the node N23 ((6) PATH in FIG. 6).

The node N23 finally conducts the path setting in the transmission node D23 on the basis of the message, and sends a path establishing response message back to the neighboring node N22 defined as a destination of the path establishing request message. This path establishing response message reaches the originating node N11 in a way that traces back the route along which the path establishing request message has been transferred. When this path establishing response message reaches the originating node N11, the path establishing signaling is terminated.

<Operation/Effect in First Embodiment>

Herein, an operation and an effect of the MPLS/GMPLS network system in the first embodiment discussed above will be described.

In the system, the control node, as to the control plane, collects and retains the link information about the links between the respective control nodes within the same area and the summary link information about the links to the control nodes outside the area, and, with respect to the data plane, collects and retains the detailed link information about the links between the respective transmission nodes within the same area.

When receiving the path establishing request from the originating transmission node to the terminating transmission node outside the area on the data plane, the control nodes exchange the signaling protocol on the control plane, whereby the path setting is done in each of the transmission nodes on the route of the should-be-established path.

At this time, in the control node, when the control node in charge of controlling the terminating transmission node is judged to the node outside the area, any one of the boundary nodes is determined, based on the link information and the summary link information on the control plane, as the egress node becoming an egress toward the area to which the terminating control node belongs.

Subsequently, in the control node, the route to the thus-determined egress node is determined based on the detailed link information on the data plane. The path establishing request message, in which control node information of the control nodes included in the determined route is set in the route information, is sent to the downstream neighboring node on the route.

Thus, in the system, the control plane routing protocol capable of grasping the link information and the summary link information on the whole control plane is set in a cooperative linkage with the data plane routing protocol capable of grasping the detailed link information on the data plane within the area, whereby the egress node becoming the relay node to another area, to which the terminating node belongs, from within the area, is automatically determined. With this automatic determination, the system can automatically establish the path over the area.

Further, the determination of the egress node involves using the summary link information and the link information on the control plane, wherein the proper egress node on the control plane is determined. This operation enables the proper establishment of the path over the area.

Second Embodiment

An MPLS/GMPLS network system (which will hereinafter be referred to as the system) configured by the communication devices according to a second embodiment of the present invention will be described. The system in the first embodiment discussed earlier is that in the case of determining the route to the transmission node outside the area, the egress node within the same area is determined by employing the link information on the control plane, and the route to the egress node is determined by using the detailed link information on the data plane. The system in the first embodiment, however, determines the egress node without taking the detailed link information on the data plane into consideration, and therefore has a possibility that an egress node having none of the route satisfying communication resources (a communication bandwidth, a cost, etc.) requested on the data plane might be selected. The system in the second embodiment further includes a function of determining an alternate route in order to obviate the problem arising in such a case.

[System Architecture/Communication Device]

A network architecture shall be the same as in the first embodiment illustrated in FIG. 1. Further, each of the communication devices configuring the system is also the same as in the first embodiment other than an alternate route determining function in the control node.

An alternate route determination method based on this function differs in its actualizing technique depending on a scene of its being executed.

One technique is actualized by an extension of the egress node determination method in the first embodiment. Namely, the technique is such that with respect to the egress node determined from the link information on the control plane, in the case of finding out none of the route that satisfies the request on the occasion of obtaining the route within the same area to the egress node on the basis of the detailed link information on the data plane, and a different egress node is determined from the link information on the control plane.

Another technique is actualized by an extension of a crankback function. Namely, this technique is that the egress node receiving the path establishing request message sends back a path establishing error message, thereby determining again a different egress node.

Operational Example

An operational example of the system related to the alternate route determining function described above, will be explained. Other functions are the same as those in the first embodiment, and hence the explanations of the operations related to these functions are omitted. This alternate route determining function is different in its operation to some extent depending on two scenes that will be shown as follows, and is therefore described on a scene-by-scene basis.

Figure 7:
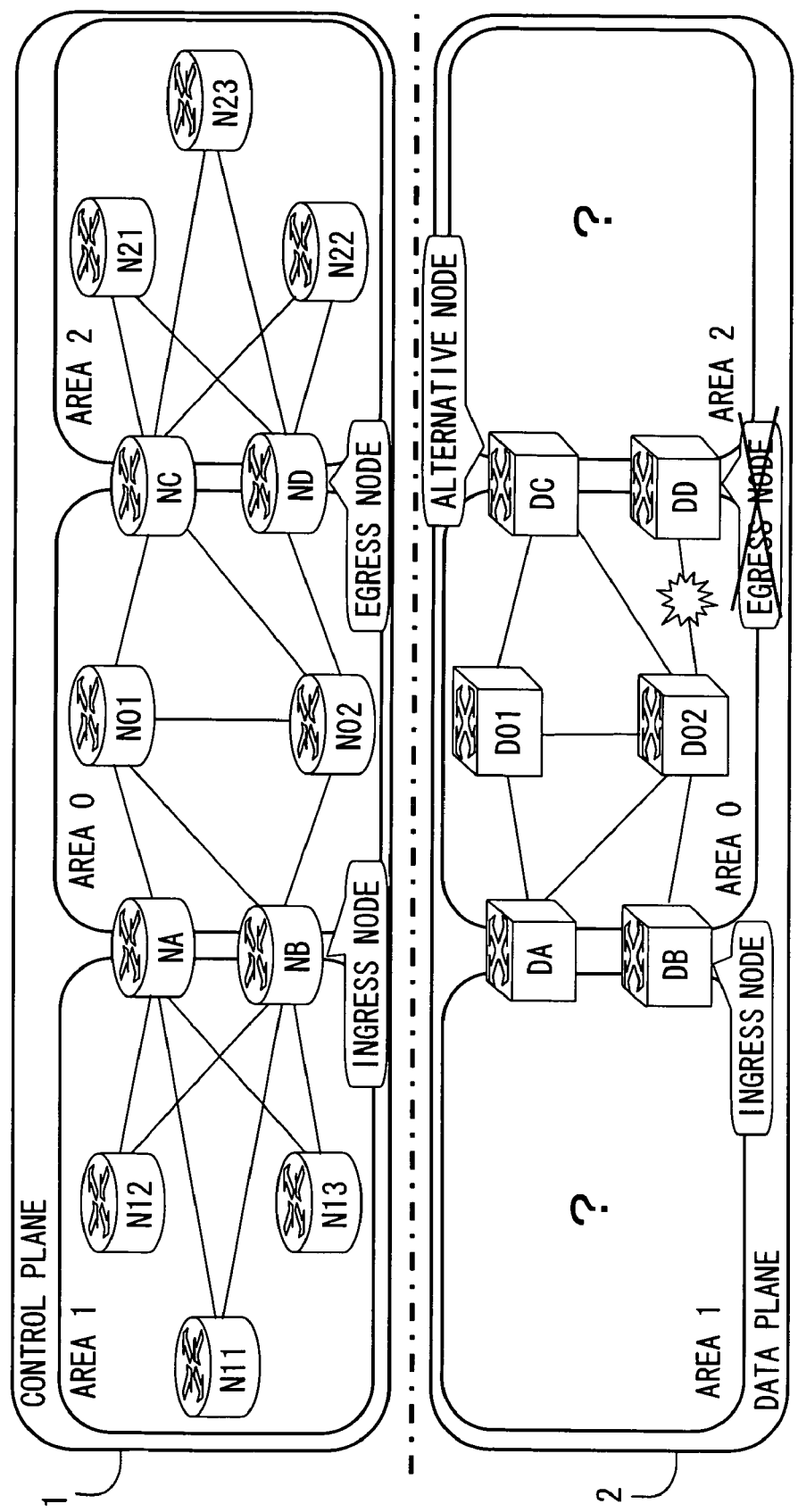
FIG. 7 is a diagram showing an alternate route determination scene 1.

A first scene is a scene of finding out, based on the egress node determined by the egress node determination method in the first embodiment, none of the route that meets the request on the occasion of obtaining the route within the same area to this egress node. The alternate route determining function in this scene will be explained with reference to FIG. 7. FIG. 7 is a diagram showing an alternate route determination scene 1 and also illustrating a case where the link between the node D02 and the node DD on the data plane 2 is not satisfied with the requested path resources.

In such a case, the node NB receiving the path establishing request message, because of the terminating node N23 being a node outside the area, determines the egress node. It is assumed that the node NB determines the node ND as the egress node. The determination of the egress node involves using the information on the control plane, but the detailed link information on the data plane is not taken into consideration, and consequently there might be a case that such a state occurs.

When determining the egress node, the node NB determines, based on the detailed link information on the data plane, the route from the node DB to the egress node DD. At this time, the node NB, when detecting that the link between the node D02 and the node DD does not satisfy the requested path resources and that there are no other routes from the node DB to the node DD, executes the alternate route determining function. In the alternate route determining function, the node ND is excluded from the link information on the control plane, and the egress node is again determined. Through this function, the node NB determines the node NC as a new egress node. The processes from this onward are the same as those in the first embodiment, and hence their explanations are omitted.

Figure 8:
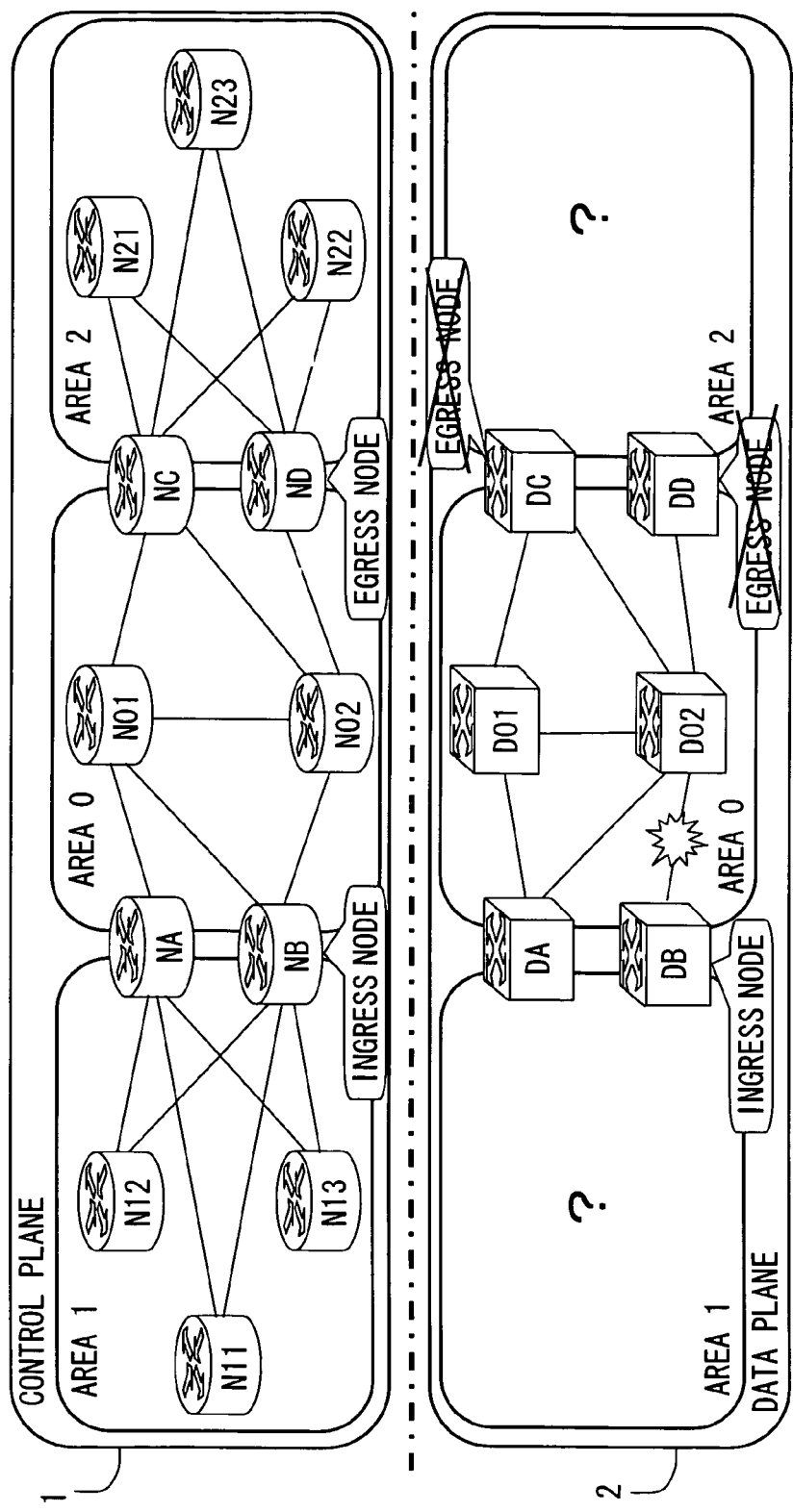
FIG. 8 is a diagram showing a first alternate route determination scene 2.
Figure 9:
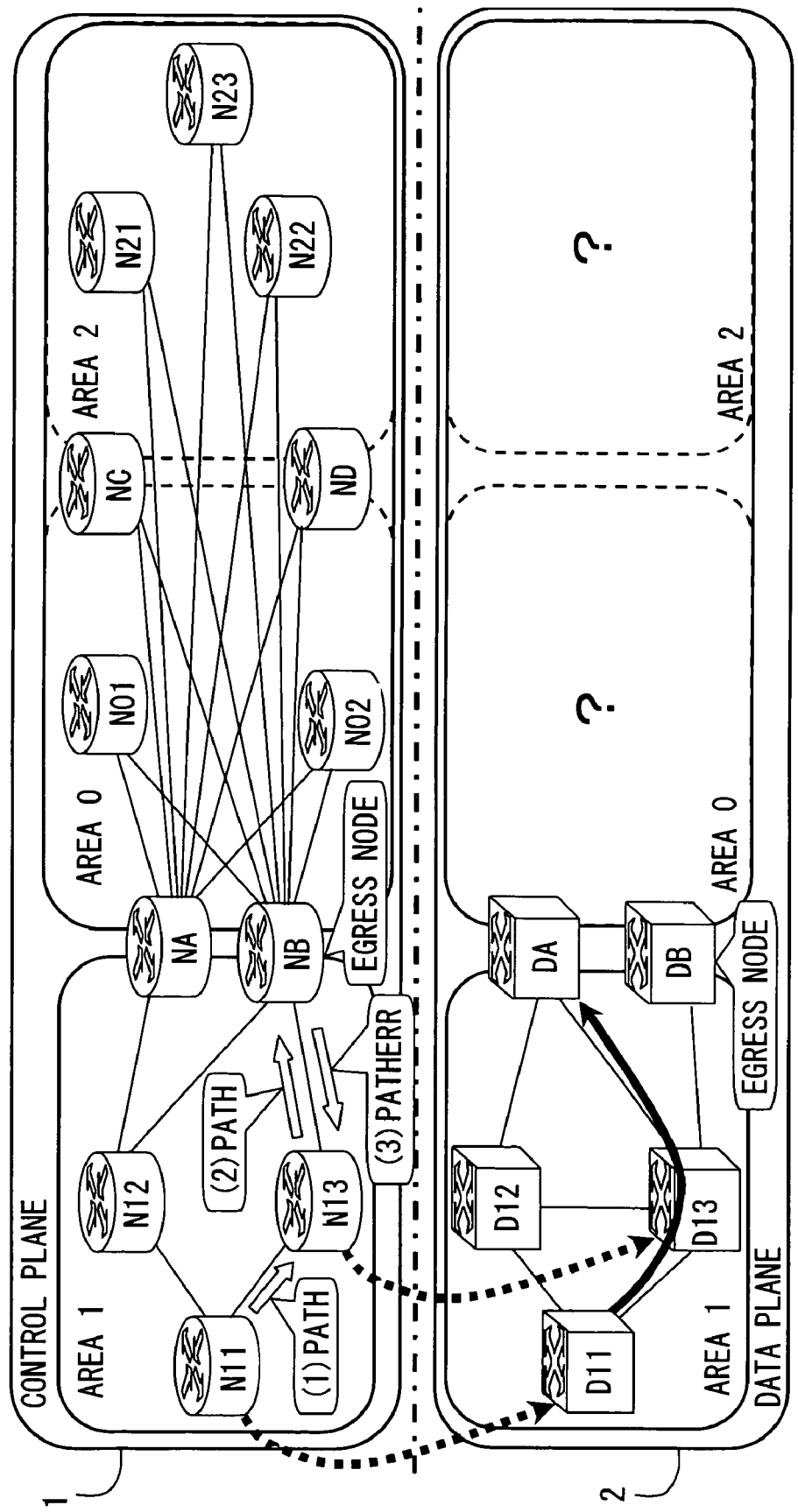
FIG. 9 is a diagram showing a second alternate route determination scene 2.

A second scene is a scene, wherein after the path establishing request message has reached the egress node determined by the egress node determination method in the first embodiment, it is detected that this egress node has none of the route that meets the request. The alternate route determining function in this scene will be explained with reference to FIGS. 8 and 9. FIGS. 8 and 9 are diagrams each showing an alternate route determination scene 2 and illustrating a case where the link between the node DB and the node D02 on the data plane is not satisfied with the requested path resources.

In such a scene, the node NB receiving the path establishing request message, as in the fist scene, determines the node ND as the egress node and further determines, based on the detailed link information on the data plane, the route from the node DB to the egress node DD. Moreover, the node NB, as in the first scene, judges that the node ND is not appropriate for the egress node and executes the alternate route determining function. In this scene, however, the link between the node DB and the node D02 is not satisfied with the requested path resources, and hence it is judged that any egress node for the node NB can not be alternated with. Namely, it is judged that any egress node for the node DB does not exist.

In this case, the node NB is originally not appropriate for the relay node, and therefore a path establishing error message is sent back in a way that traces back the route along which the path establishing request message has been transferred ((3) PATHERR in FIG. 9). At this time, the node information of the node with an error occurred is stored in the path establishing error message. It is, however, impossible to judge from only the node information whether the node is a node inappropriate for the egress node (boundary node) or a node that lacks the requested communication resources (the communication bandwidth, CPU performance, etc.).

Accordingly, in the system, a code or a flag showing an error type is provided in the path establishing error message, thereby making it possible to judge which case the node encounters the error occurrence in.

It is to be noted that the judgment described above can be made if it is recognizable whether the node with the error occurred is the boundary node or not, and hence list information of the boundary nodes may previously be set in each node. In this case, when receiving the path establishing error message, the judgment may also be made by comparing the preset boundary node information with the error node information contained in the path establishing error message.

Further, the information exchanged based on the routing protocol contains the boundary node information, so that each node may acquire and retain the information.

The node N13 receiving the path establishing error message, when judging by the error node judging method described above that the node NB as the sender of the path establishing error message is a node inappropriate for the egress node, executes the alternate route determining function. Through this alternate route determining function, at first, the node N13 deletes the path that has already been set in the transmission node D13. Then, the node N13 excludes the node NB out of the link information on the control plane, and determines again the egress node. In this case, the node N13 determines the node NA as an alternate egress node.

The node N13, when the route to the egress node is confirmed from the detailed link information on the data plane, sends to the node NA the path establishing request message containing the route information being strict-designated the node NA. This path establishing request message is, since the node N13 and the node NA are not directly neighbored on the control plane, sent via a predetermined route (e.g., N13->N11->N12->NA) by IP routing and thus reaches the node NA.

Note that in the discussion given above, the determination of the alternate route is done by the node N13 and may also be executed by the node N11. The determination may be executed by the node having such a crankback function according to the present invention.

<Operation/Effect in Second Embodiment>

Herein, an operation and an effect of the MPLS/GMPLS network system in the second embodiment described above will be explained.

In the system, when the egress node determined from the link information on the control plane is judged to be the inappropriate relay node from the detailed link information on the data plane, the determined egress node is excluded from the link information on the control plane, and the egress node is re-determined.

Further, in the system, the boundary node determined as the egress node and receiving the path establishing request message further determines the egress node within the self-area, in which case this boundary node, when judging that the egress node can not be determined as a result of repeating the re-determination based on the technique described above, judges that the node itself is not appropriate for the relay node.

Then, the path establishing error message containing a setting of the self-node information as error node information is sent in the direction along which the path establishing request message has been transferred. Hereat, when a next control node determines the egress node, a flag etc. giving an indication of the self-node being the boundary node is set in order to inform that the self-node should be excluded.

In the control node receiving the path establishing error message, when detecting that the node contained in the error information is the boundary node, this boundary node is excluded, and the egress node is again determined.

Through this operation, even when the egress node determined from the link information on the control plane is inappropriate from the detailed link information on the data plane, the automatic restoration is conducted, and eventually the proper route is determined. Hence, the path over the area can be automatically established.

Third Embodiment

Given as below is a description of the MPLS/GMPLS network system (which will hereinafter be referred as to the system) configured by the communication devices according to a third embodiment of the present invention. The system in the first embodiment discussed earlier is configured so that the segmented areas are connected to the backbone area, however, the system in the third embodiment is a system that actualizes the establishment of the path extending over areas in a case where an area unconnected to the backbone area exists, i.e., the network is segmented into four or more areas.

[System Architecture]

Figure 10:
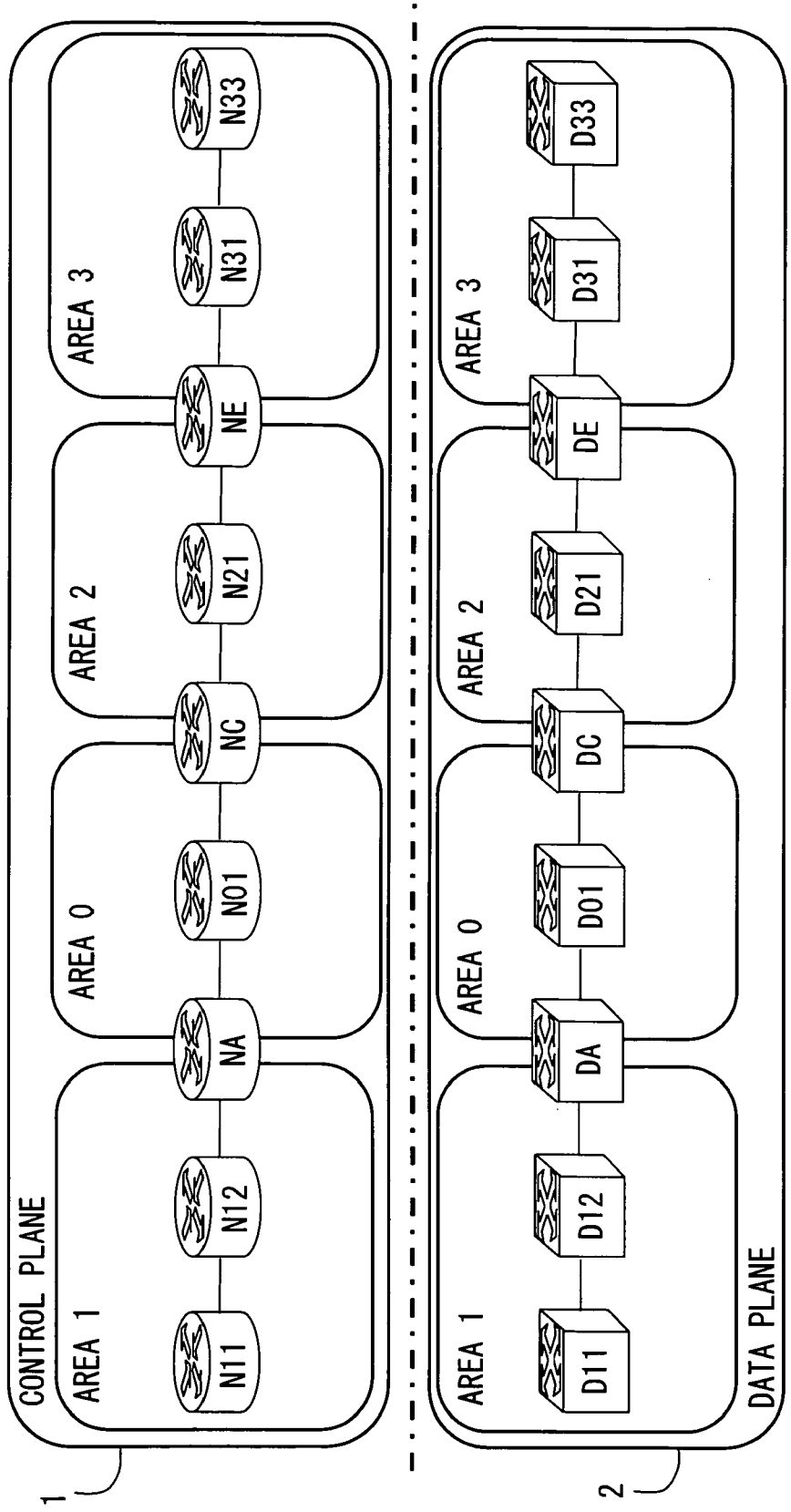
FIG. 10 is a diagram showing a network architecture in a third embodiment.

A network architecture of the system will be explained with reference to FIG. 10. FIG. 10 is a diagram showing the network architecture of the system. In the system also, as in the first embodiment, the network is managed in separation into the control plane 1 and the data plane 2. Then, in the system, the network is segmented into the area 1, the area 2, the area 0 serving as the backbone area for the areas 1 and 2, and an area 3 that is not connected to the backbone area 0.

Then, on the control plane 1, the nodes NA, NC and NE become the boundary nodes. On the data plane 2, the boundary nodes are the transmission nodes (DA, DC, DE) within the same communication devices as those including the boundary nodes on the control plane. It should be noted that the system has the simple network architecture for simplifying the description but is not limited to this architecture.

[Communication Device]

Each of the communication devices configuring the system is the same as that in the first embodiment or the second embodiment. The system, however, has the areas unconnected to the backbone areas, and hence the egress node determining function in each communication device is different from those in the first embodiment and the second embodiment. Other functions are the same as those in the other embodiments.

Figure 11:
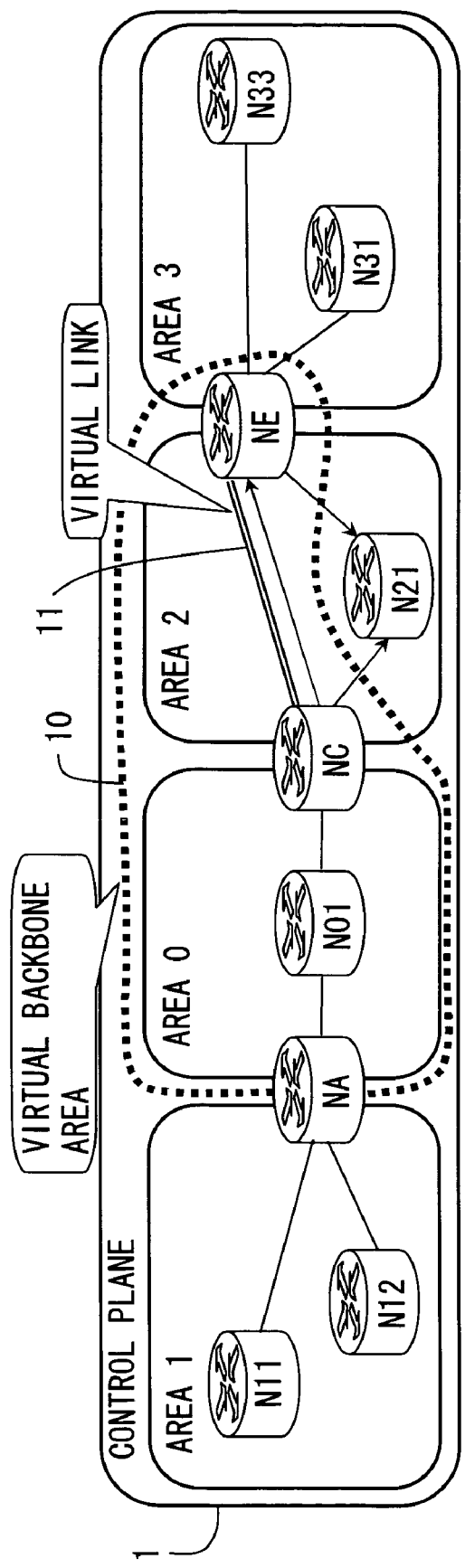
FIG. 11 is a diagram showing control plane routing in the third embodiment.

The OSPF of the control plane routing protocol has the definition that all the areas must be connected to the backbone areas, and therefore, as to the link information about the area such as the area 3 in the system, which is not connected directly to the backbone area, the area 3 being virtually connected to the backbone area by employing a logical virtual link, a summary LSA is generated. An operation of the control plane routing in the case of the system will hereinafter be explained with reference to FIG. 11. FIG. 11 is a diagram showing an outline of how the control plane routing operates in the system.

In the area 0 serving as the backbone area, the boundary nodes NA and NC generate the summary LSAs about the nodes within the area 1 and the area 2, and send the summary LSAs to the respective nodes within the area 0. This is because the areas 1 and 2 are connected directly to the area 0 and is as explained in the first embodiment. By contrast, the node NE connected by a virtual link 11 generates the summary LSAs about the nodes N31 and N33 in the area 3, and sends this summary LSAs to the nodes NA, N01 and NC within the area 0. Further, an LSA is generated about the node NE as a node connected via the virtual link 11 to the node NC within the same area (the area 0: a virtual backbone area 10), and this LSA is sent to the respective nodes in the area 0.

Accordingly, the respective nodes in the area 0 recognize the node NE as the node existing in the same area and also recognize this node NE as the node existing outside the area 0. Then, a piece of information showing a virtual link as an attribute is set in the link information of the link between the node NE in the case of its being recognized as the node within the same area and the node NC. Note that the link information of the link to the node NE in the case of its being recognized as the node outside the area 0 is exchanged by such a process that the boundary node NC generates the summary LSA.

Thus, in the system having the existence of the area that is not connected to the backbone area, the technique of collecting the link information on the control plane is different, and hence the egress node determining function in each of the communication devices is required to be switched over to the egress node determining function in the first embodiment. The reason is that if the egress node determination method in the first embodiment is utilized in the network architecture as built up in the system, the node connected by the virtual link but actually not existing in the backbone area might be selected as the egress node in the backbone area, and there occurs a state where the route selection can not be done on the data plane.

The egress node determination method in the control node in the system will hereinafter be described with reference to FIG. 11. Note that the egress node determination methods in the area 1 and the area 2 are the same as in the first embodiment, so that only an egress node determination method in the area 0, which is characteristic of the system, will be explained. Two methods, which will be shown as below, are considered as the egress node determination method in the system, and both of these methods may be employed. Note that as illustrated in FIG. 11, in the system, the virtual link 11 is established between the node NC and the node NE.

A first egress node determination method 1 is a method by which the link information on the control plane, between the originating node (the ingress node) within the area and the virtual egress node, is searched in the sequence from the originating node till the virtual link is detected, and a node anterior to the virtual link detected for the first time is determined as the egress node.

In FIG. 11, the egress node determination method 1 will be explained by exemplifying a case in which the node NA determines the egress node. The node NA, when judging from the link information etc. on the control plane that the terminating node N33 does not exist within the same area, executes the egress node termination method 1. The control node NA, on the occasion of determining the egress node, to start with, determines, as a virtual egress node, a node having a minimum cost of summary link information (the information based on the summary LSA) to the terminating node N33. In this case, the node NE is determined as the virtual egress node.

Next, the node NA selects, based on the link information on the control plane, the shortest route from the node NA to the virtual egress node NE. In this case, there is selected a route such as node NA->node N01->node NC->node NE. Hereat, the node NE is recognized as the node existing within the same area and, besides, recognized as the node existing outside the area, however, this route selection uses the node information as the node within the same area.

Subsequently, the node NA searches for the link attribute information showing the virtual link by tracing the link information on the control plane from the originating node (ingress node) NA to the virtual egress node NE along the selected route. Then, the node NA determines, as the egress node, a node to which the link information is finally traced when the virtual link is detected for the first time. In this case, the link between the node NC and the node NE is detected as the first virtual link, and therefore the node NC is determined as the egress node.

A second egress node determination method 2 is a method by which, conversely to the first method, the link information on the control plane is searched in the sequence from the virtual egress node till the virtual link disappears, and a node anterior to the real link detected for the first time is determined as the egress node.

The second method will be explained by exemplifying a case in which the control node NA determines the egress node in FIG. 11. The operation from the determination of the virtual egress node NE by the control node NA to the selection of the shortest route from the node NA to the virtual egress node NE, is the same as by the first method.

Thereafter, the node NA searches for the link attribute information showing none of the virtual link by tracing the link information on the control plane from the virtual egress node NE to the originating (ingress) node NA along the selected route. Then, a node to which the link information is finally traced when the link defined not to be the virtual link is detected for the first time, is determined as the egress node. In this case, the link between the node NC and the node N01 is detected as the link defined not to be the first virtual link, so that the node NC is determined as the egress node.

Operational Example

Figure 12:
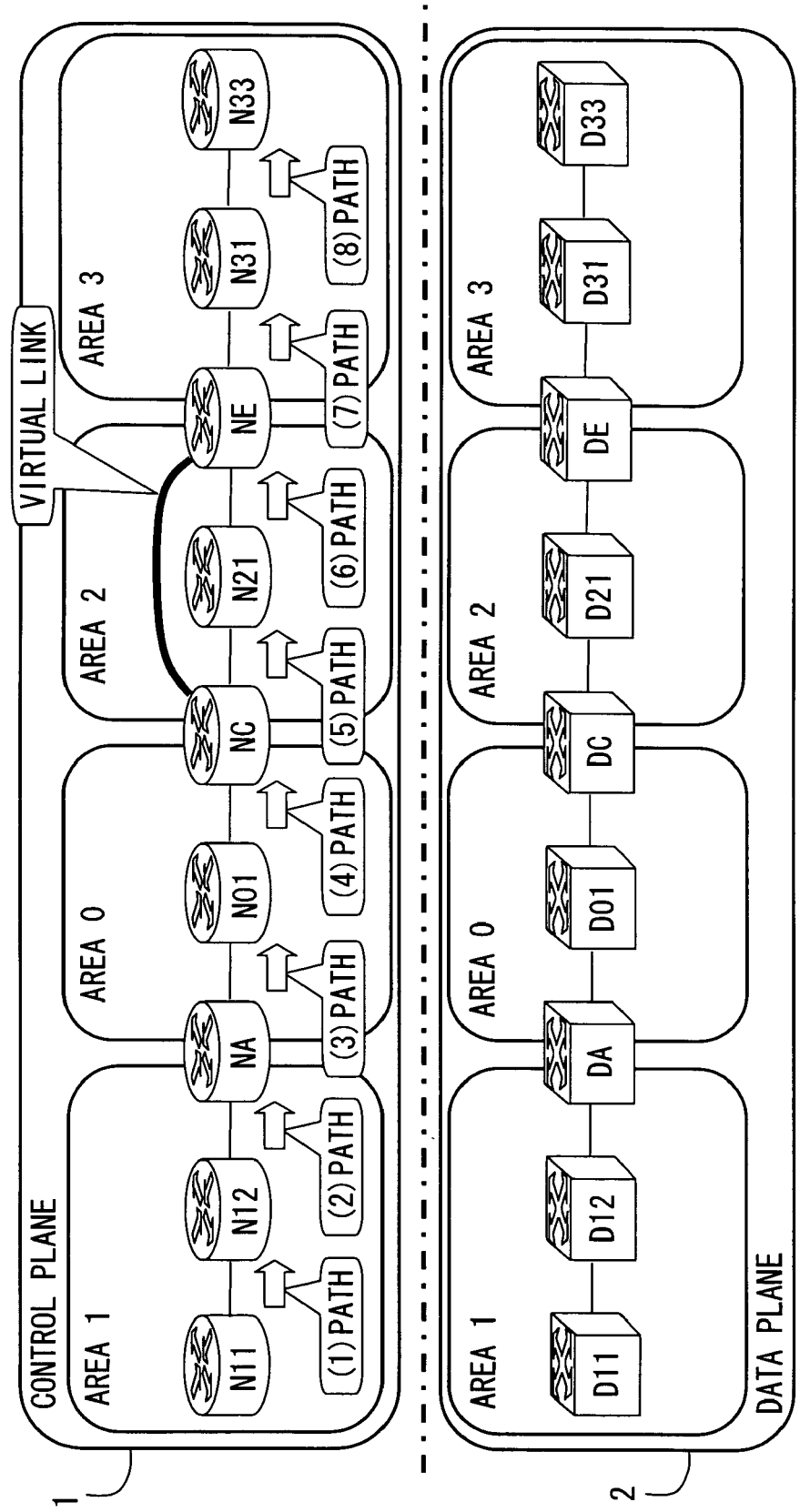
FIG. 12 is a diagram showing path establishing signaling in the third embodiment.

An operational example of the system in the case of employing the egress node determination method described above, will be explained with reference to FIG. 12. FIG. 12 is a diagram showing a path establishing signaling operation in the third embodiment. The operation other than the egress node determination method is basically the same as in the other embodiments, and therefore the explanation of the operation related to these functions will be simplified.

To begin with, each of the control nodes configuring the system, through the information exchange using the routing protocol, as to the control plane, has the link information about the respective links described above. Then, the virtual link 11 is established between the node NC and the node NE, and the area 0 and the area 3 are virtually connected to each other.

The control node N11 serving as the originating node, when receiving a path establishing request from the transmission node D11 to the transmission node N33, at first judges whether or not the control node N33 serving as the terminating node exists within the same area. The node N11, when judging that the node N33 is the node outside the same area, determines the egress node by using any one of the two methods described earlier. The area 1 has no existence of the virtual link on the route to the node N33, and therefore the node NA determined as the virtual egress node is determined to be the egress node as it is. Note that the egress node determination method in the area 1 may involve using the egress node determination method in the first embodiment because of its being unrelated to the virtual link.

When determining the egress node, the node N11 determines, based on the detailed link information on the data plane, the route from the node N11 to the egress node NA. Herein, the node N11 selects the route via the node N12, and sets a path, leading to the transmission node D12, in the transmission node D11. Then, the node N11 strict-designates the node N12 and the node NA, and sends to the node N12 a path establishing request message containing the route information in which the node N33 is loose-designated ((1) PATH in FIG. 12).

The operation of the node N12 receiving the path establishing request message is the same as in the first embodiment and the second embodiment, and hence its explanation is omitted. Namely, the node N12, after setting the path in the transmission node D12, transfers the path establishing request message to the downstream neighboring node NA ((2) PATH in FIG. 12).

The node NA receiving the path establishing request message, as the downstream node N33 set in the route information contained in the message is loose-designated, computes a downstream route. The node NA judges whether or not the loose-designated node N33 exists within the same area. The node NA, when judging that the node N33 is a node existing outside the same area, determines the egress node by employing any one of the two methods described earlier. Namely, on the assumption that the virtual egress node is the node NE, the node NA searches for the virtual link or the real link, thereby finally determines the node NC as the egress node.

The node NA, which has determined the egress node, as in the case of the node N11, sets the path in the transmission node DA, and sends to the downstream neighboring node N01 a path establishing request message containing the route information in which the node N01 and the node NC are strict-designated while the node N33 is loose-designated ((3) PATH in FIG. 12).

The node N01 receiving the path establishing request message, as in the case of the node N12 explained before, sets path in the transmission node D01, and transfers the path establishing request message to the node NC ((4) PATH in FIG. 12).

The node NC receiving the path establishing request message, as the downstream node N33 set in the route information contained in the message is loose-designated, computes the downstream route. In this case, the egress node determination made by the node NC is the same as in the case of the node N11 described earlier. Namely, because of being unrelated to the virtual link, the node NC determines the egress node NE by using any one of the two methods described before or by employing the egress node determination method in the first embodiment. The operation after determining the egress node is the same as the node described above operates.

Hereafter, in the area 2, the path establishing request message is transferred to the node N21 and the node NE in this sequence, and the respective nodes perform the path setting of the transmission nodes D21 and DE.

Then, the node NE, when receiving the path establishing request message, as the node N33 serving as the terminating node is a node within the same area, determines the route leading to the node N33 on the basis of the link information on the data plane. Hereafter, in the area 3, the path establishing request message is transferred to the nodes N31 and N33, and a path to the transmission node D33 is established. Finally, the node N33 sends back the path establishing response message by tracing back the route along which the path establishing request message has been transferred, thus terminating the path establishing signaling.

<Operation/Effect in Third Embodiment>

Herein, an operation and an effect of the MPLS/GMPLS in the third embodiment will be described.

In the system having the architecture where the network is segmented into the plurality of areas including the area (area 3) that is not connected to the backbone area, each of the control nodes within the backbone area collects the summary link information from the boundary node NE connected by the virtual link as the link information of the link to the control nodes within the area 3.

Hence, in the system, when the egress node is determined in the backbone area, at first, the virtual egress node is determined based on the summary link information on the control plane.

Subsequently, the route to the virtual egress node is determined by employing the link information on the control network, and, when the control node connected by the virtual link is detected by searching the link information on the control plane toward the selected egress node along the determined route, the detected control node is determined as the egress node.

With this operation, it is possible to actualize the system capable of automatically executing the proper path setting also in the network having the existence of the area that is not connected to the backbone area.

Further, the egress node determination method may also be such that if the control node connected by the real link is detected by searching the link information on the control plane in a direction opposite to the direction of the selected egress node along the determined route, the detected control node is determined as the egress node.

Figure 13:
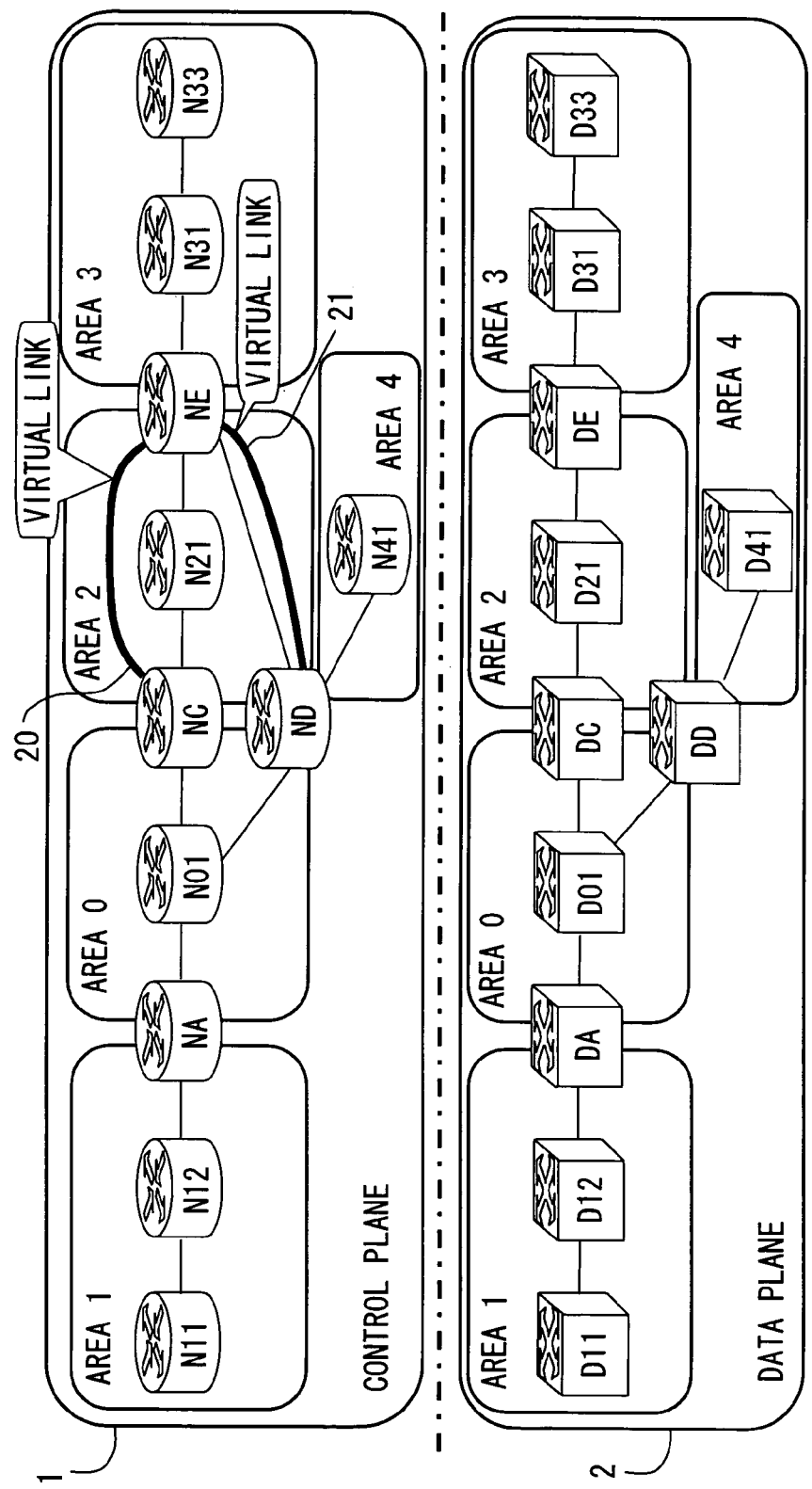
FIG. 13 is a diagram showing an egress node determination method 2 in the third embodiment.

The use of this method is effective, for instance, in the system having the network architecture illustrated in FIG. 13. FIG. 13 is a diagram showing the egress node determination method 2 in the system described above. In the network architecture shown in FIG. 13, when the node NA determines a route to the node N41, the node ND is selected as a virtual egress node. Hereafter, the shortest route to the virtual egress node ND is computed such as node NA->node N01->node NC->node ND, in which case the node ND can be promptly determined as the egress node by executing the egress node determination method 2.

With this operation, it is feasible to promptly determine the boundary node belonging to the self-area as the formal egress node in such a case that the shortest route to the virtual egress node extends via the different area connected by the virtual link back to the self-area.

Modified Example

Figure 14:
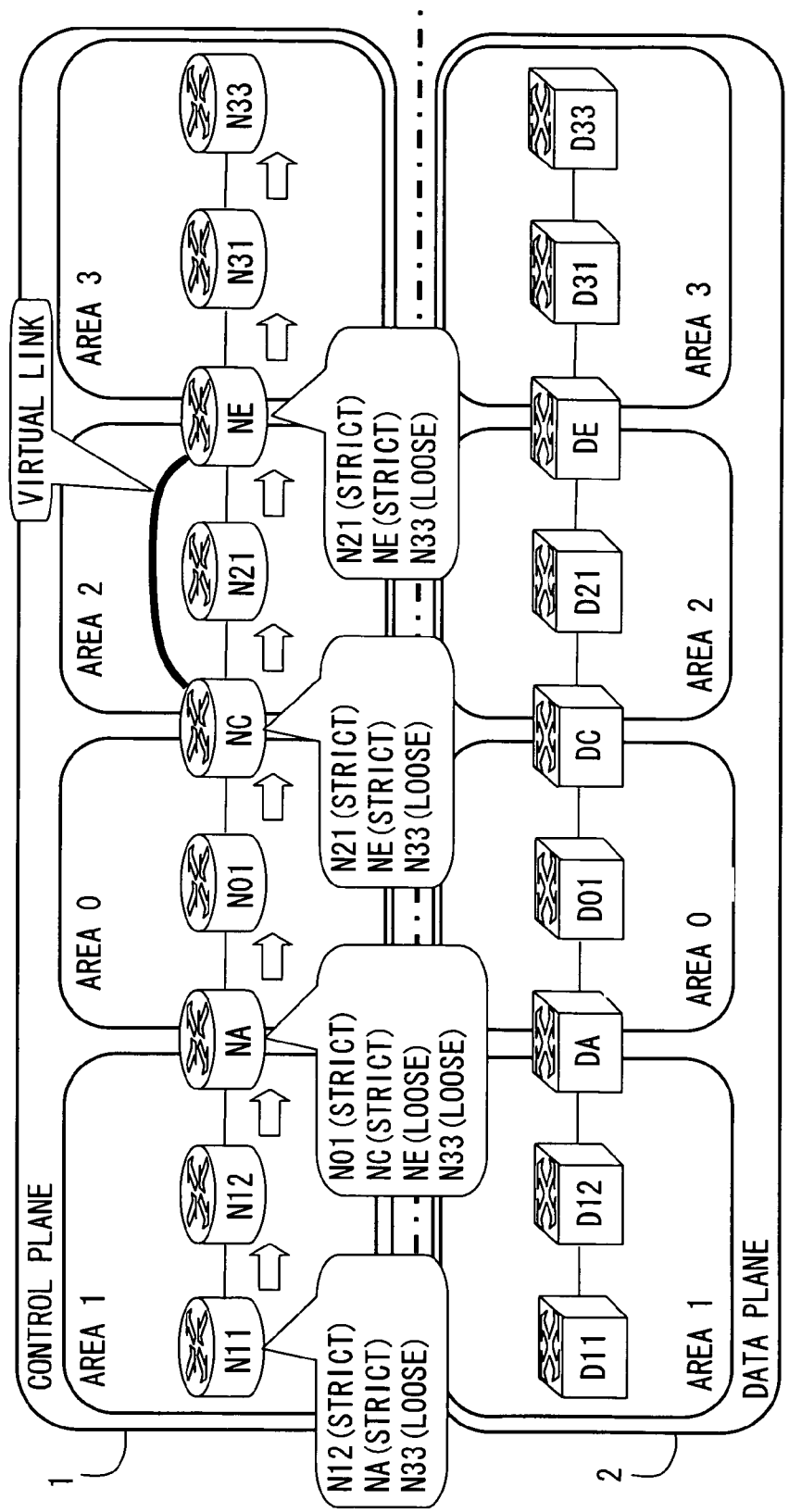
FIG. 14 is a diagram showing the path establishing signaling in a modified example of the third embodiment.
Figure 15:
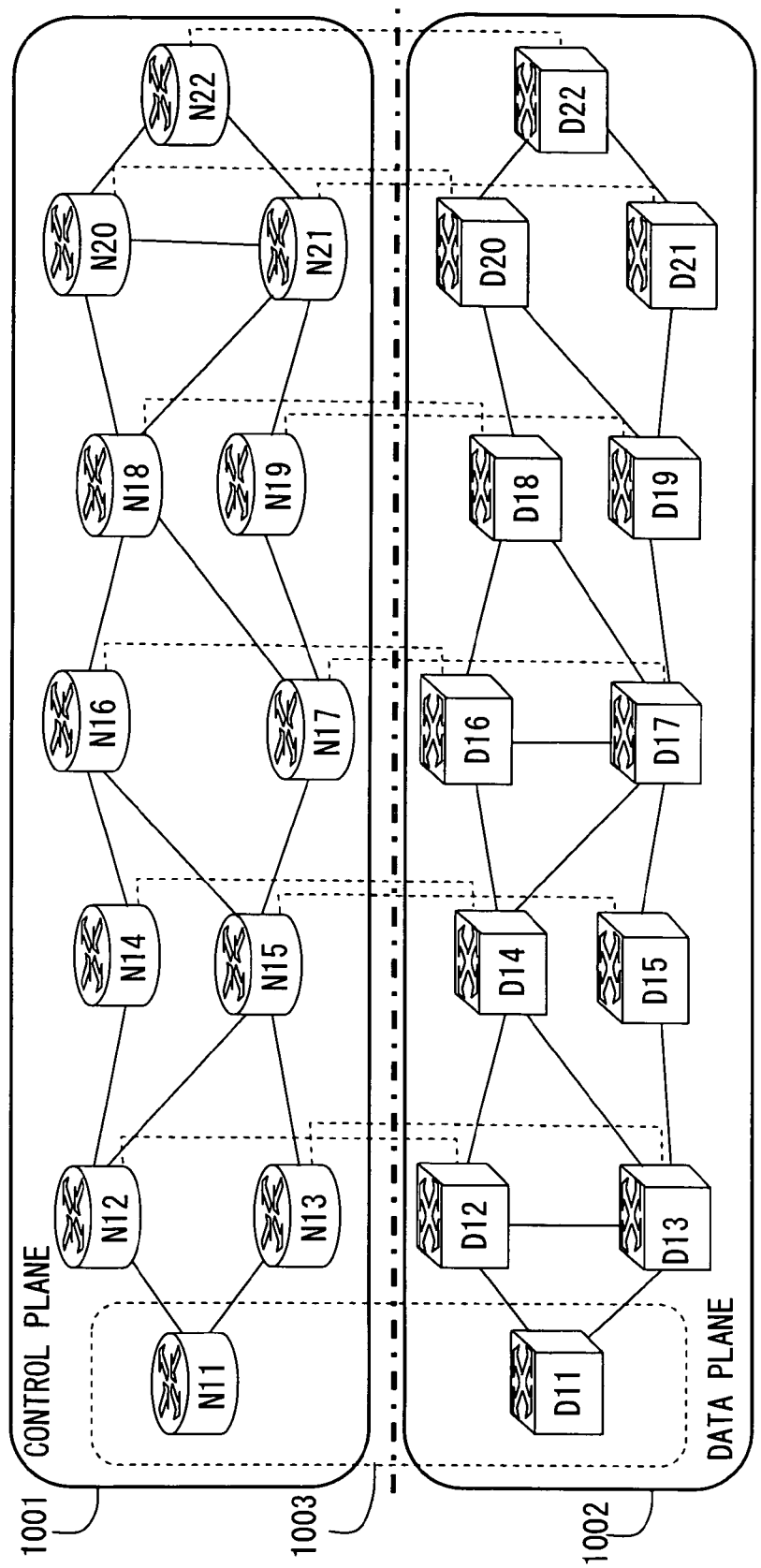
FIG. 15 is a diagram showing a control plane and a data plane.
Figure 16:
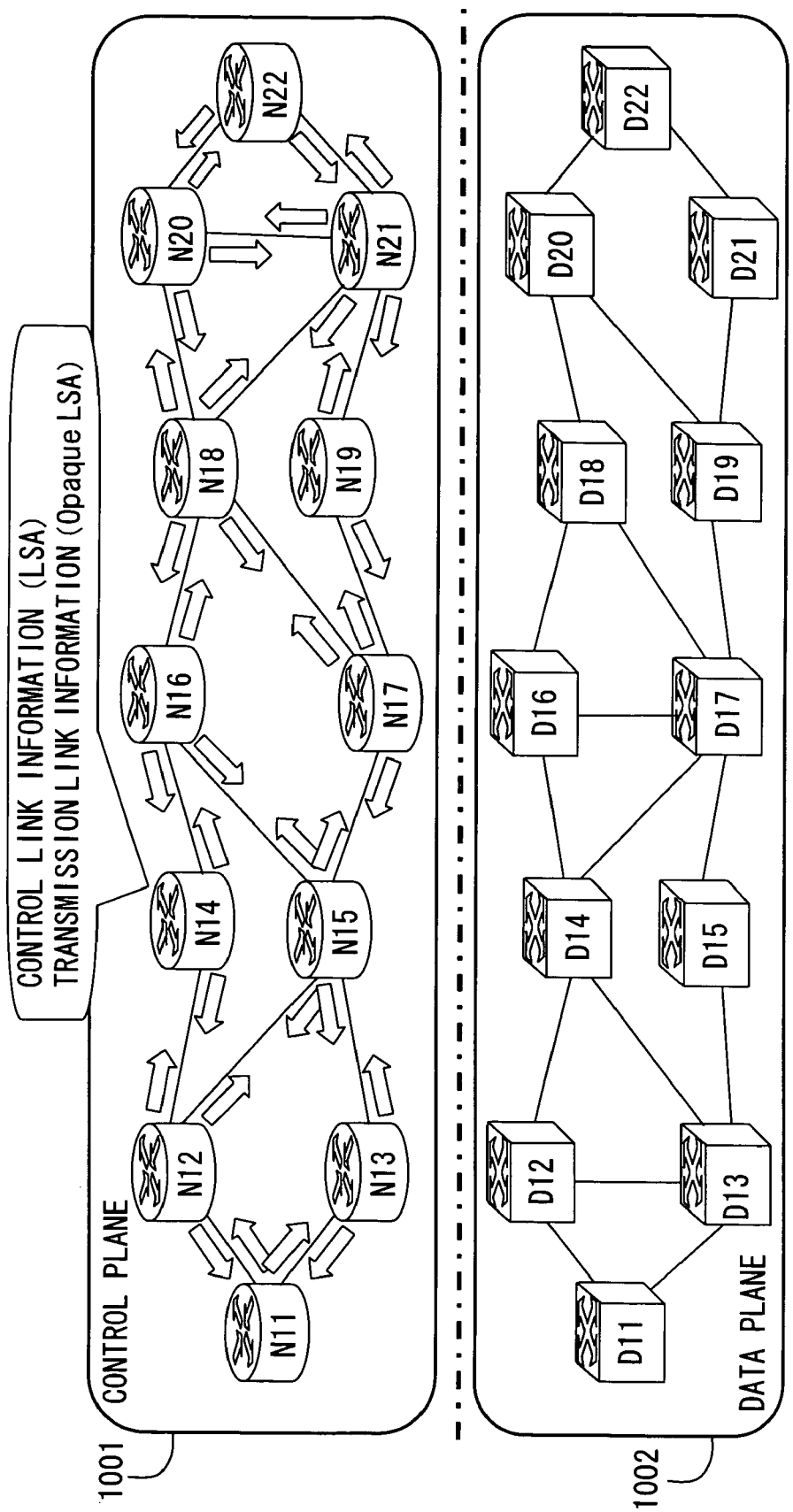
FIG. 16 is a diagram showing a routing protocol.
Figure 17:
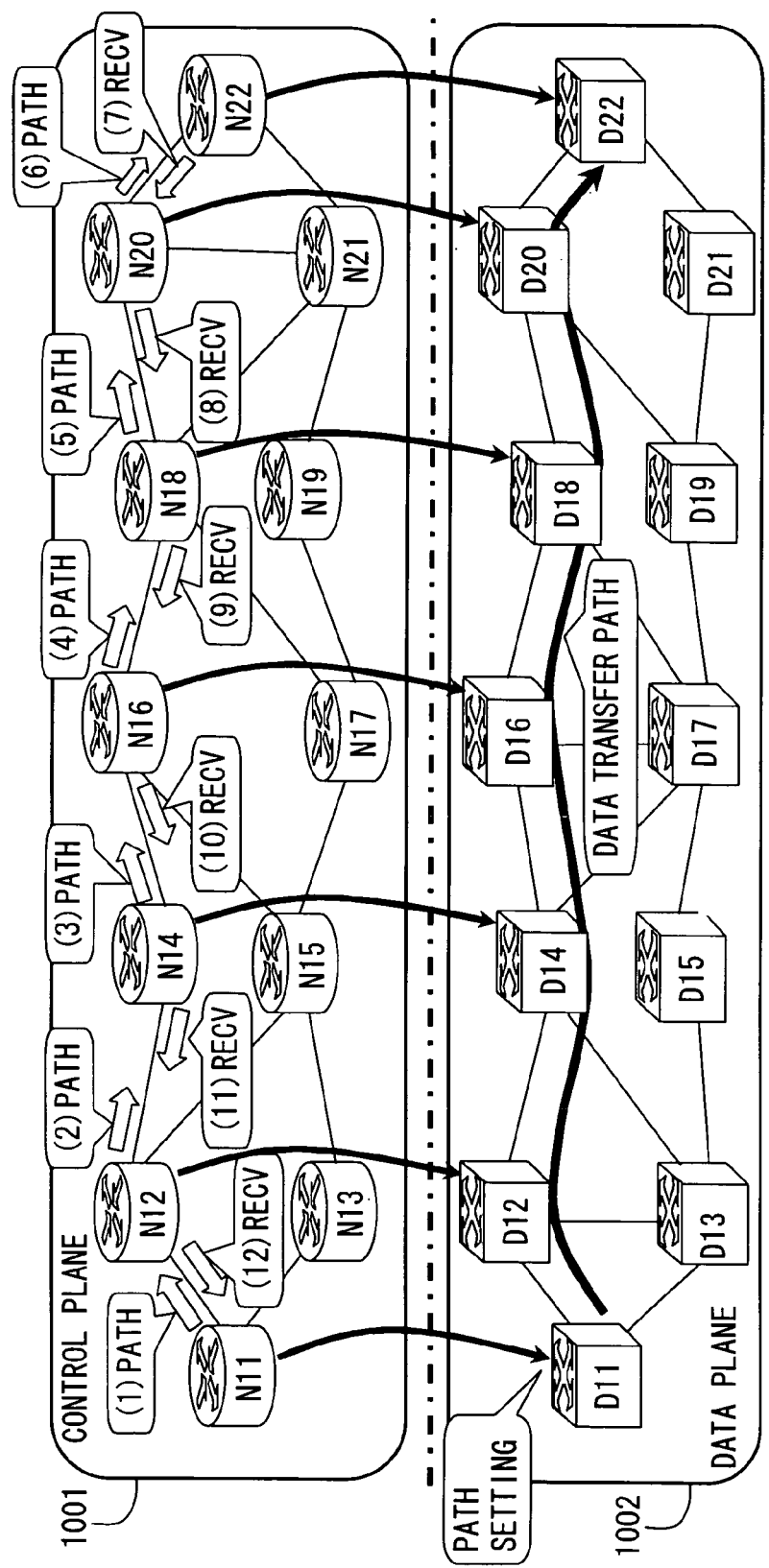
FIG. 17 is a diagram showing the path establishing signaling.
Figure 18:
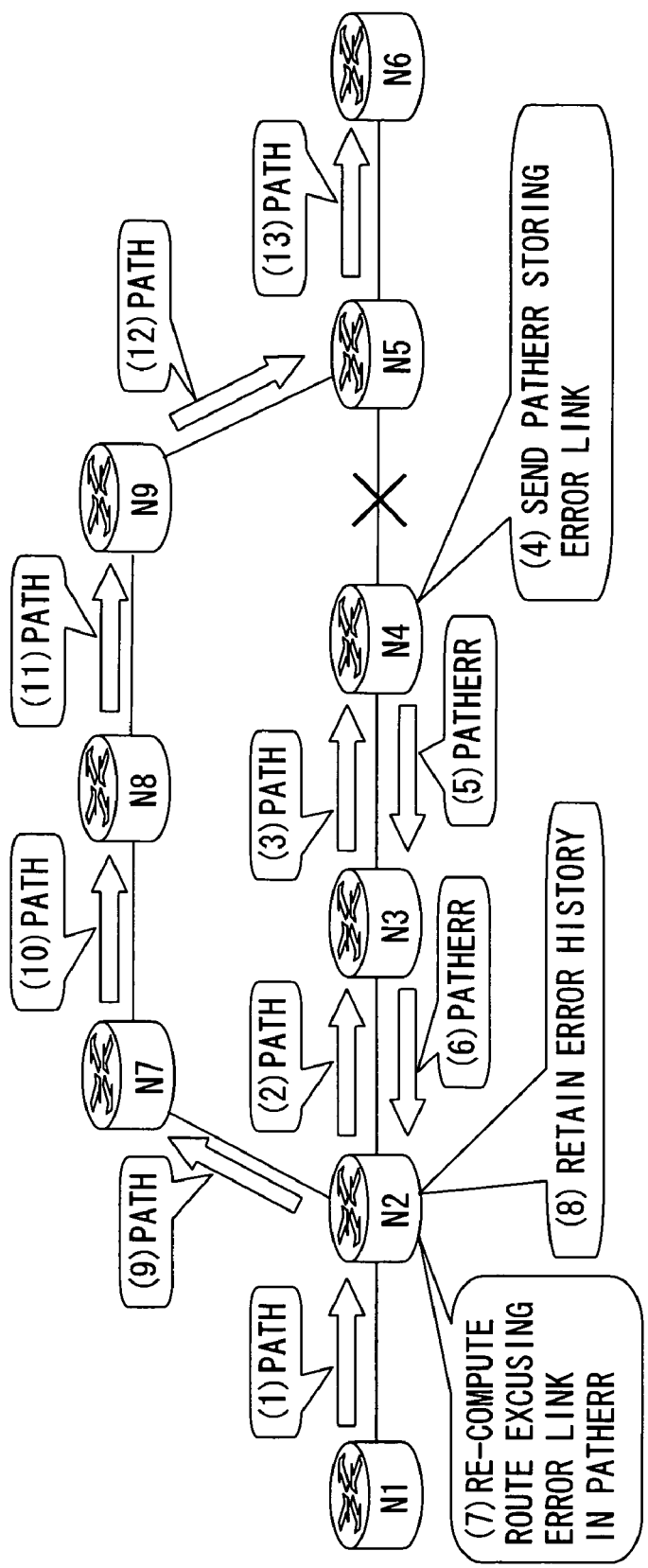
FIG. 18 is a diagram showing a crankback operation of the path establishing signaling.
Figure 19:
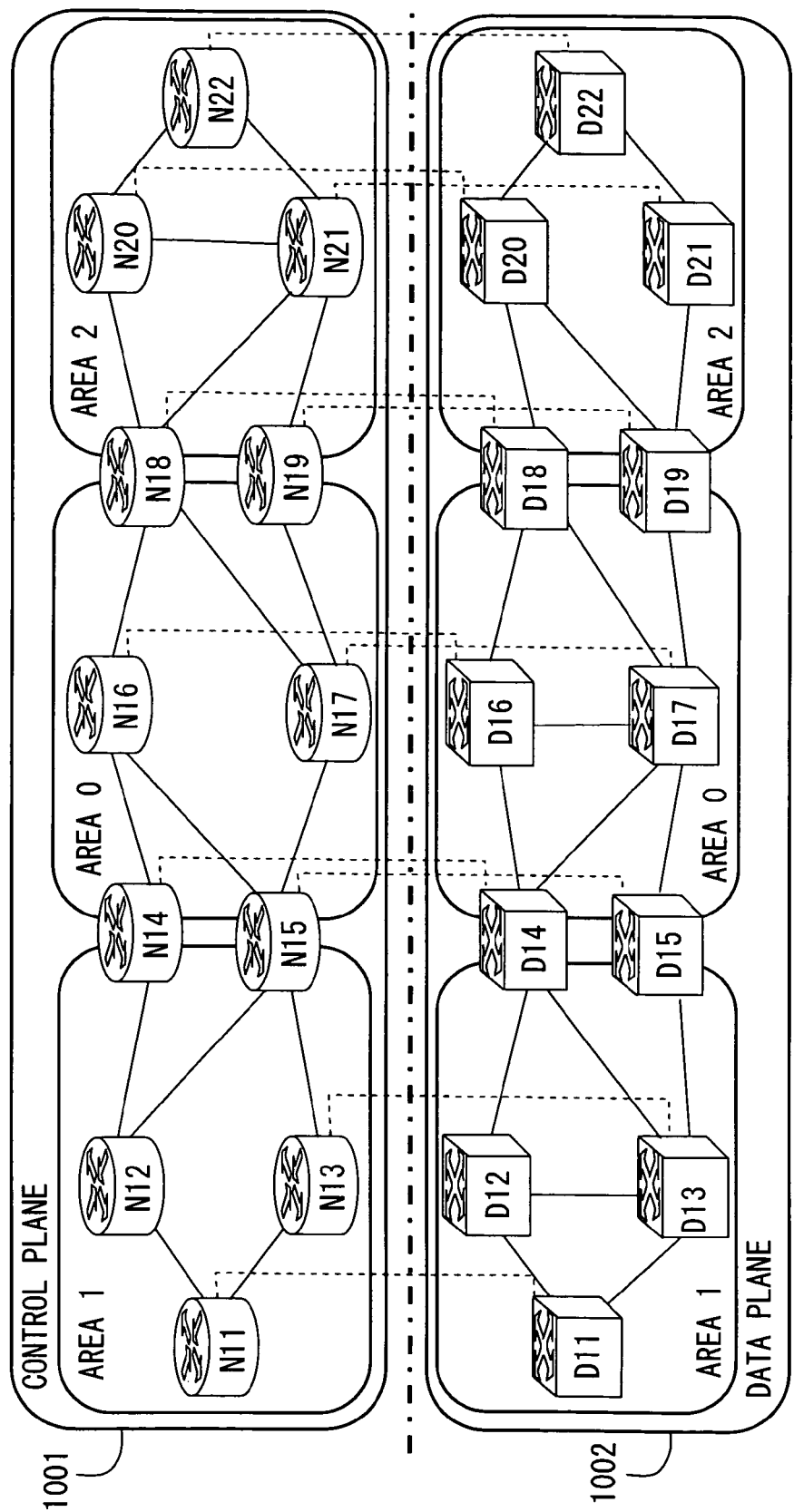
FIG. 19 is a diagram showing a network segmented into a plurality of areas.
Figure 20:
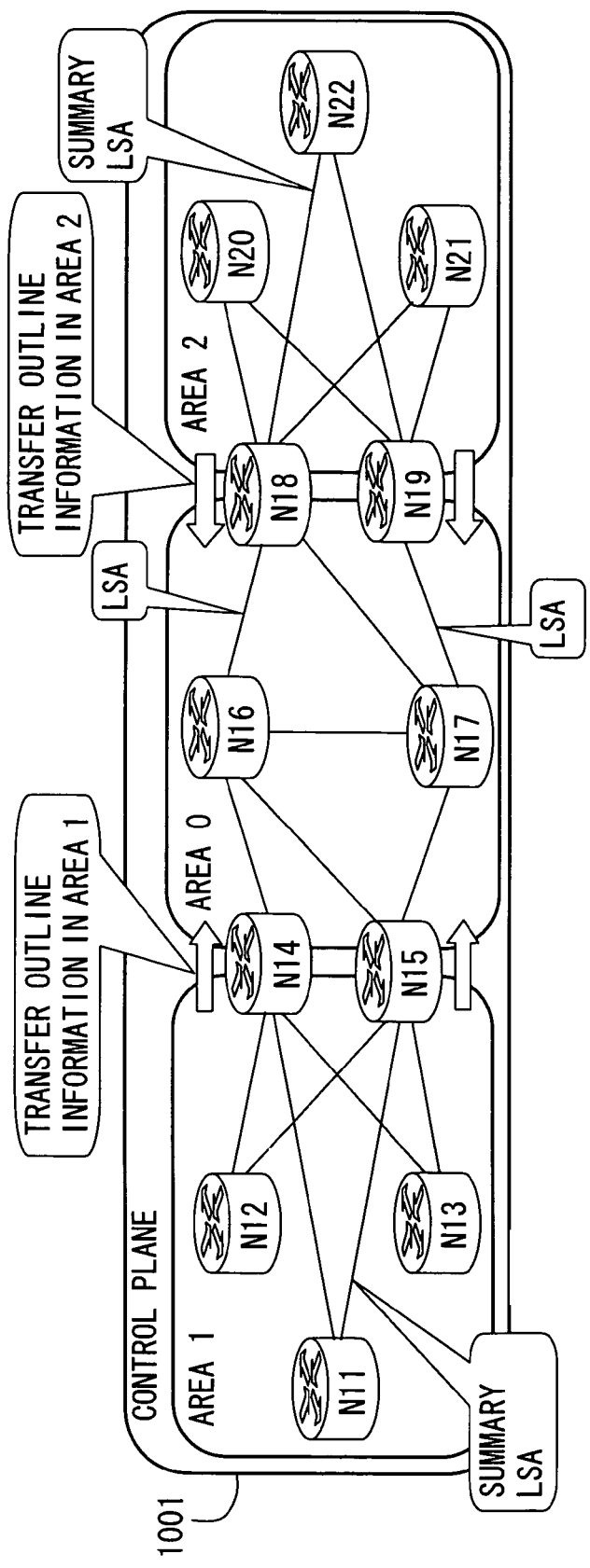
FIG. 20 is a diagram showing control plane routing (area 0) in the case of being segmented into the plurality of areas.
Figure 21:
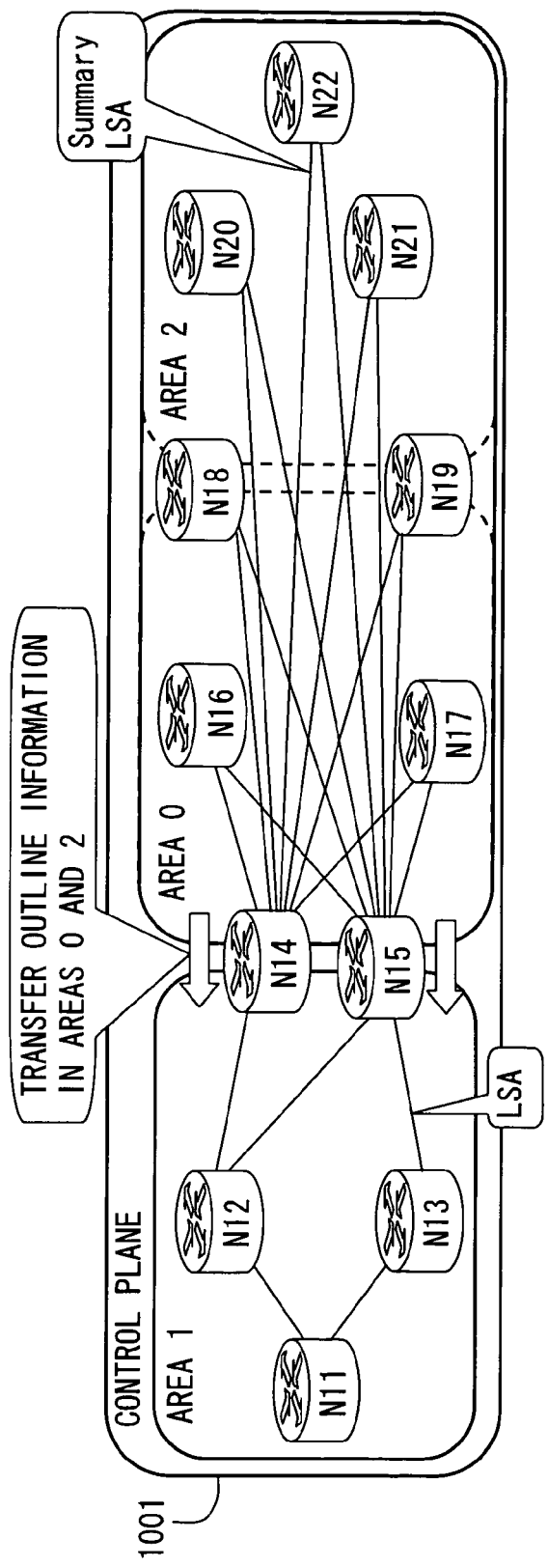
FIG. 21 is a diagram showing the control plane routing (area 1) in the case of being segmented into the plurality of areas.
Figure 22:
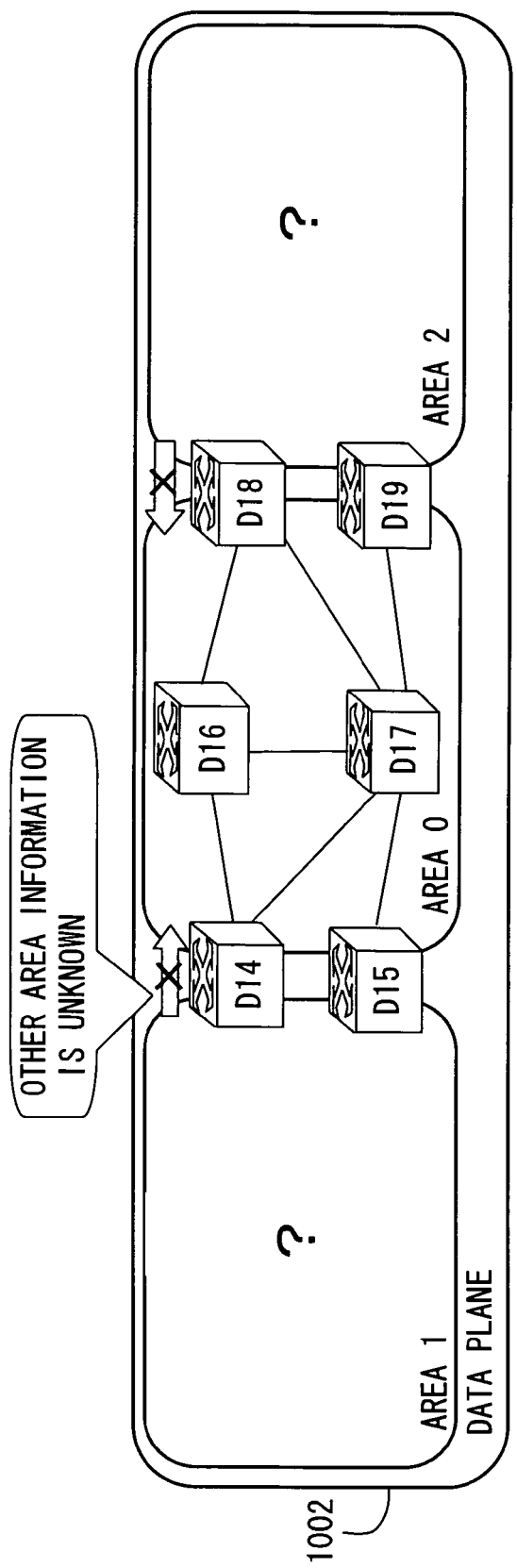
FIG. 22 is a diagram showing data plane routing (area 0) in the case of being segmented into the plurality of areas.
Figure 23:
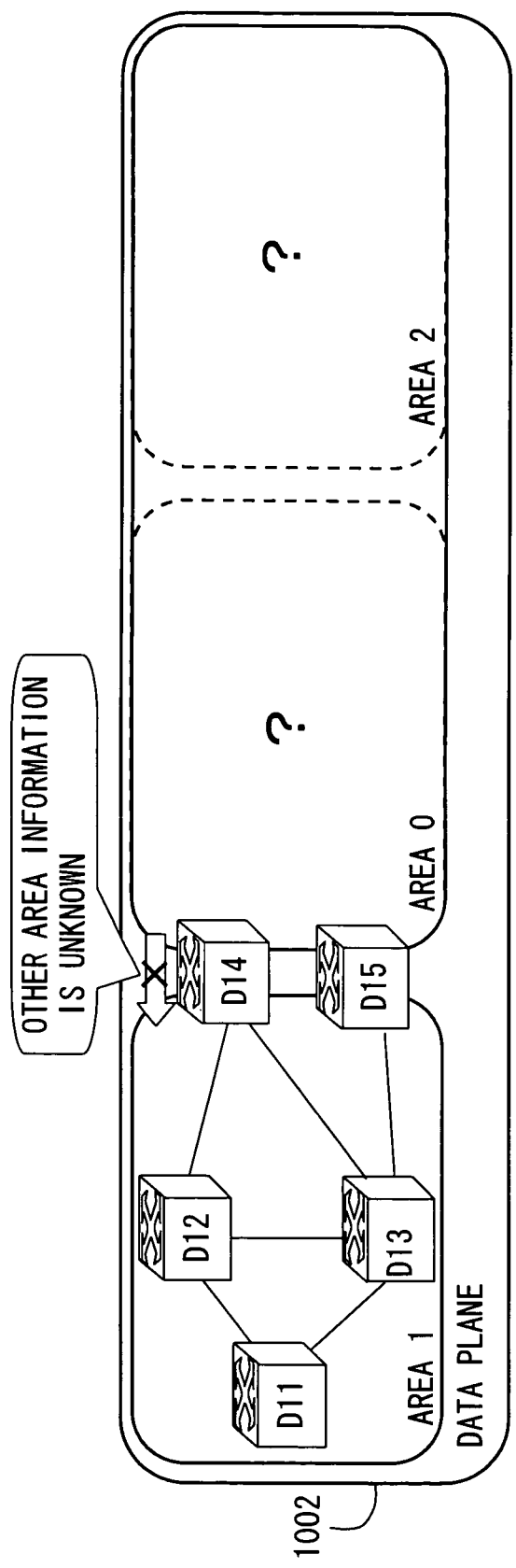
FIG. 23 is a diagram showing the data plane routing (area 1) in the case of being segmented into the plurality of areas.

The system in the third embodiment discussed above adopts the two egress node determination methods, however, in the case of employing the method 2 (the method of searching in the sequence from the virtual egress node till the virtual link disappears), an egress node determining process count can be reduced by modifying the path establishing signaling operation as follows. A modified example of the path establishing signaling by use of the egress node determination method 2 will hereinafter be described with reference to FIG. 14. FIG. 14 is a diagram showing the path establishing signaling operation in the modified example of the third embodiment.

The modified example is such that when tracing the nodes from the virtual egress node till the virtual link disappears in the case of using the egress node determination method 2, the nodes traced are retained, and the path establishing request message contains the route information in which the retained nodes are loose-designated.

The node NA, in the case of employing the egress node determination method 2, at first, determines, as the virtual egress node, the node NE having a minimum cost of summary link information (the information based on the summary LSA) to the terminating node N33. Then, the node NA selects the shortest route to the virtual egress node NE from the node NA on the basis of the link information on the control plane. For example, a route such as node NA->node N01->node NC->node NE is selected.

Herein, the node NA searches for the link attribute information showing none of the virtual link by tracing the selected route from the virtual egress node NE to the originating node (ingress node) NA, however, at this time the node NA retains the traced nodes till it is detected that the virtual link disappears. In this example, the node to be traced from the virtual egress node NE till it is detected that the virtual link disappears is only the virtual egress node NE, and hence only the node NE is retained. For instance, if other nodes exist between the virtual egress node NE and the egress node NC to be determined, it follows that these nodes are retained.

Thereafter, the node NA, when sending the path establishing request message, strict-designates the node N01 and the node NC but loose-designates the terminating node N33, and at the same time makes the path establishing request message contain the route information in which the retained node NE is loose-designated.

With this contrivance, it follows that the node NC receiving the path establishing request message may compute the route on the basis of the link information on the data plane without executing the egress node termination process. Consequently, the fast path establishment can be actualized.

<Others>

The disclosures of Japanese patent application No. JP2005-245324, filed on Aug. 26, 2005 including the specification, drawings and abstract are incorporated herein by reference.

What is claimed is:

1. A communication device among a plurality of communication devices in a network system that is managed separately divided into a transmission network for transferring real data on a data plane and a control network for conducting transfer control of the real data on the control plane, and is segmented into a plurality of areas in which any communication devices exists, each of the plurality of communication devices managed as both a transmission node in the transmission network and a control node in the control network, the communication device comprising:

a control link collecting unit to collect link information for each link disposed between respective control nodes in the control network and within a first area, in which a control node of the communication device itself exists, using a control plane routing protocol, and to collect summary link information for each link disposed between a control node of at least one first boundary communication device and control nodes, which exist in each of other areas one of which is a second area, using a control plane routing protocol, the at least one first boundary communication device being located at a boundary between the first area and the second area;

a transmission link collecting unit to collect detailed link information for each link disposed between respective transmission nodes in the transmission network and within the first area using a data plane routing protocol, the detailed link information having more information than the link information and the summary link information;

a selection unit to select, when determining a route from a transmission node of the communication device itself to a transmission node as a terminating node existing in one of the other areas, an egress node becoming an egress of the first area in a direction of the area in which the terminating node exists from the control node of the at least one first boundary communication device based on the summary link information collected using the control plane routing protocol; and a determination unit to determine a route to the egress node, which is selected based on the summary link information collected using the control plane routing protocol, based on the detailed link information collected using the data plane routing protocol, wherein the control link collecting unit collects, as the link information within the first area, link information on a virtual link between the control node of the first boundary communication device and a control node of a second boundary communication device located at a boundary between the second area in which the first boundary communication device exists and a third area in which the first boundary communication device does not exist, and collects the summary link information on each link between a control node of the second boundary communication device and control nodes within the third area, the selection unit includes:

a route determining unit to determine, as a virtual egress node, the control node of the second boundary communication device based on the summary link information collected by the control link collecting unit and determine a route to the virtual egress node by use of the link information of the control network collected by the control link collecting unit; and a changing unit to change the determined virtual egress node with the control node of the first boundary communication device connected by the virtual link when detecting the control node of the first boundary communication device connected by the virtual link by searching the link information of the control network collected by the control link collecting unit in a direction from the control node of the communication device itself toward the virtual egress node along the route determined by the route determining unit.

2. A communication device among a plurality of communication devices in a network system that is managed separately divided into a transmission network for transferring real data on a data plane and a control network for conducting transfer control of the real data on a control plane, and is segmented into a plurality of areas in which any communication devices exists, each of the plurality of communication devices managed as both a transmission node in the transmission plane and a control node in the control network, the communication device comprising:

a control link collecting unit to collect link information for each link disposed between respective control nodes in the control network and within a first area, in which a control node of the communication device itself exists, using a control plane routing protocol, and to collect summary link information for each link disposed between a control node of at least one first boundary communication device and control nodes, which exist in each of other areas one of which is a second area, using a control plane routing protocol, the at least one first boundary communication device being located at a boundary between the first area and the second area;

a transmission link collecting unit to collect detailed link information for each link disposed between respective transmission nodes in the transmission network and within the first area using a data plane routing protocol, the detailed link information having more information than the link information and the summary link information;

a selection unit to select, when determining a route from a transmission node of the communication device itself to a transmission node as a terminating node existing in one of the other areas, an egress node becoming an egress of the first area in a direction of the area in which the terminating node exists from the control node of the at least one first boundary communication device based on the summary link information collected using the control plane routing protocol; and a determination unit to determine a route to the egress node, which is selected based on the summary link information collected using the control plane routing protocol, based on the detailed link information collected using the data plane routing protocol, wherein the control link collecting unit collects, as the link information within the first area, link information on a virtual link between the control node of the first boundary communication device and a control node of a second boundary communication device located at a boundary between the second area in which the first boundary communication device exists and a third area in which the first boundary communication device does not exist, and collects the summary link information on each link between a control node of the second boundary communication device and control nodes within the third area, the selection unit includes:

a route determining unit to determine, as a virtual egress node, the control node of the second boundary communication device based on the summary link information collected by the control link collecting unit and determine a route to the virtual egress node by use of the link information of the control network collected by the control link collecting unit; and a changing unit to change the determined virtual egress node with the control node of the first boundary communication device connected by a real link, not the virtual link, when detecting the control node of the first boundary communication device connected by the real link by searching the link information of the control network collected by the control link collecting unit in a direction from the virtual egress node toward the control node of the communication device itself along the route determined by the route determining unit.

3. The communication device according to claim 2, wherein the changing unit includes a storage unit to store information on the control nodes searched for till the control node connected by the real link is detected on the occasion of searching in a direction opposite to the direction of the egress node, and transmit a path establishing request message, in which the information on the control nodes stored in the storage unit to use one of the control nodes as the egress node to the another area are set in the route information.

4. A path setting method executed by a communication device among a plurality of communication devices in a network system that is managed separately divided into a transmission network for transferring real data on a data plane and a control network for conducting transfer control of the real data on a control plane, and is segmented into a plurality of areas in which any communication devices exists, each of the plurality of communication devices managed as both a transmission node in the transmission network and a control node in the control network, the path setting method including:

collecting link information for each link disposed between respective control nodes in the control network and within a first area, in which a control node of the communication device itself exists, using a control plane routing protocol, and collecting summary link information for each link disposed between the control node of at least one first boundary communication device and control nodes, which exist in each of other areas one of which is a second area, using the control plane routing protocol, the at least one first boundary communication device being located at a boundary between the first area and the second area;

collecting detailed link information for each link disposed between respective transmission nodes in the transmission network and within the first area using a data plane routing protocol, the detailed link information having more information than the link information and the summary link information;

selecting, when determining a route from a transmission node of the communication device itself to a transmission node as a terminating node existing in one of the other areas, an egress node becoming an egress of the first area in a direction of the area in which the terminating node exists from the control node of the at least one first boundary communication device based on the summary link information collected using the control plane routing protocol; and determining a route to the egress node, which is selected based on the summary link information collected using the control plane routing protocol, based on the detailed link information collected using the data plane routing protocol, wherein the collecting the link information collects, as the link information within the first area, link information on a virtual link between the control node of the first boundary communication device and a control node of a second boundary communication device located at a boundary between the second area in which the first boundary communication device exists and a third area in which the first boundary communication device does not exist, and collects the summary link information on each link between a control node of the second boundary communication device and control nodes within the third area, the selecting includes:

determining, as a virtual egress node, the control node of the second boundary communication device based on the collected summary link information and determining a route to the virtual egress node by use of the collected link information of the control network; and changing the determined virtual egress node with the control node of the first boundary communication device connected by the virtual link when detecting the control node of the first boundary communication device connected by the virtual link by searching the collected link information of the control network in a direction from the control node of the communication device itself toward the virtual egress node along the determined route.

5. A path setting method executed by a communication device among a plurality of communication devices in a network system that is managed separately divided into a transmission network for transferring real data on a data plane and a control network for conducting transfer control of the real data on a control network, and is segmented into a plurality of areas in which any communication devices exists, each of the plurality of communication devices managed as both a transmission node in the transmission network and a control node in the control network, the path setting method including:

collecting link information for each link disposed between respective control nodes in the control network and within a first area, in which a control node of the communication device itself exists, using a control plane routing protocol, and collecting summary link information for each link disposed between the control node of at least one first boundary communication device and control nodes, which exist in each of other areas one of which is a second area, using the control plane routing protocol, the at least one first boundary communication device being located at a boundary between the first area and the second area;

collecting detailed link information for each link disposed between respective transmission nodes in the transmission network and within the first area using a data plane routing protocol, the detailed link information having more information than the link information and the summary link information;

selecting, when determining a route from a transmission node of the communication device itself to a transmission node as a terminating node existing in one of the other areas, an egress node becoming an egress of the first area in a direction of the area in which the terminating node exists from the control node of the at least one first boundary communication device based on the summary link information collected using the control plane routing protocol; and determining a route to the egress node, which is selected based on the summary link information collected using the control plane routing protocol, based on the detailed link information collected using the data plane routing protocol, wherein the collecting the link information collects, as the link information within the first area, link information on a virtual link between the control node of the first boundary communication device and a control node of a second boundary communication device located at a boundary between the second area in which the first boundary communication device exists and a third area in which the first boundary communication device does not exist, and collects the summary link information on each link between a control node of the second boundary communication device and control nodes within the third area, the selecting includes:

determining, as a virtual egress node, the control node of the second boundary communication device based on the collected summary link information and determining a route to the virtual egress node by use of the collected link information of the control network; and changing the determined virtual egress node with the control node of the first boundary communication device connected by a real link, not the virtual link, when detecting the control node of the first boundary communication device connected by the real link by searching the collected link information of the control network in a direction from the virtual egress node toward the control node of the communication device itself along the determined route.

6. The path setting method according to claim 5, wherein the selecting further includes storing information on the control nodes searched for till the control node connected by the real link is detected on the occasion of searching in a direction opposite to the direction of the egress node, and transmitting a path establishing request message, in which the information on the control nodes stored to use one of the control nodes as the egress node to the another area are set in the route information.

* * * * *